United States Patent
Benicewicz et al.

(10) Patent No.: US 11,482,721 B2
(45) Date of Patent: *Oct. 25, 2022

(54) LOW PERMEABILITY POLYBENZIMIDAZOLE (PBI) GEL MEMBRANES FOR REDOX FLOW BATTERIES

(71) Applicant: UNIVERSITY OF SOUTH CAROLINA, Columbia, SC (US)

(72) Inventors: Brian C. Benicewicz, Columbia, SC (US); Laura Murdock, Columbia, SC (US); Lihui Wang, West Columbia, SC (US); Fei Huang, West Columbia, SC (US); Andrew Pingitore, Columbia, SC (US)

(73) Assignee: University of South Carolina, Columbia, SC (US)

( * ) Notice: Subject to any disclaimer, the term of this patent is extended or adjusted under 35 U.S.C. 154(b) by 45 days.

This patent is subject to a terminal disclaimer.

(21) Appl. No.: 16/570,253

(22) Filed: Sep. 13, 2019

(65) Prior Publication Data

US 2020/0091539 A1    Mar. 19, 2020

Related U.S. Application Data

(60) Provisional application No. 62/731,152, filed on Sep. 14, 2018.

(51) Int. Cl.
*H01M 8/1081* (2016.01)
*H01M 8/1086* (2016.01)
(Continued)

(52) U.S. Cl.
CPC ......... *H01M 8/188* (2013.01); *H01M 8/1027* (2013.01); *H01M 8/1032* (2013.01);
(Continued)

(58) Field of Classification Search
CPC .... H01M 8/1069; H01M 8/107; H01M 8/108; H01M 8/109
See application file for complete search history.

(56) References Cited

U.S. PATENT DOCUMENTS

| | | |
|---|---|---|
| 4,473,682 A | 9/1984 | Calundann et al. |
| 4,522,974 A | 6/1985 | Calundann et al. |
| (Continued) | | |

FOREIGN PATENT DOCUMENTS

| | | |
|---|---|---|
| CN | 101814611 | 8/2010 |
| CN | 103881127 | 6/2014 |
| (Continued) | | |

OTHER PUBLICATIONS

International Searching Authority. "International Search Report and Written Opinion" PCT/US2019/051028 (dated Jan. 27, 2020) pp. 1-11.

(Continued)

Primary Examiner — James Lee
(74) Attorney, Agent, or Firm — Dority & Manning, P.A.

(57) ABSTRACT

Disclosed are redox flow battery membranes, redox flow batteries incorporating the membranes, and methods of forming the membranes. The membranes include a densified polybenzimidazole gel membrane that is capable of incorporating a high liquid content without loss of structure that is formed according to a process that includes in situ hydrolysis of a polyphosphoric acid solvent followed by densification of the gel membrane. The densified membranes are then imbibed with a redox flow battery supporting electrolyte such as sulfuric acid and can operate at very high ionic conductivities of about 50 mS/cm or greater and with low permeability of redox couple ions, e.g. vanadium ions, (Continued)

of about $10^{-7}$ cm$^2$/s or less. Redox flow batteries incorporating the membranes can operate at current densities of about 50 mA/cm$^2$ or greater.

20 Claims, 5 Drawing Sheets

(51) Int. Cl.
  *H01M 8/18* (2006.01)
  *H01M 8/1032* (2016.01)
  *H01M 8/1044* (2016.01)
  *H01M 8/1067* (2016.01)
  *H01M 8/1027* (2016.01)

(52) U.S. Cl.
  CPC ....... *H01M 8/1044* (2013.01); *H01M 8/1067* (2013.01); *H01M 8/1081* (2013.01)

(56) References Cited

U.S. PATENT DOCUMENTS

| | | | |
|---|---|---|---|
| 4,746,694 A | 5/1988 | Charbonneau et al. |
| 4,786,567 A | 11/1988 | Skyllas-Kazacos et al. |
| 4,898,917 A | 2/1990 | Sansone |
| 5,114,612 A | 5/1992 | Benicewicz et al. |
| 5,198,551 A | 5/1993 | Benicewicz et al. |
| 5,315,011 A | 5/1994 | Benicewicz et al. |
| 5,382,665 A | 1/1995 | Benicewicz et al. |
| 5,475,133 A | 12/1995 | Douglas et al. |
| 5,575,949 A | 11/1996 | Benicewicz et al. |
| 5,583,169 A | 12/1996 | Wrobleski et al. |
| 5,658,649 A | 8/1997 | Benicewicz et al. |
| 5,840,376 A | 11/1998 | Smith et al. |
| 6,458,968 B2 | 10/2002 | Benicewicz et al. |
| 6,765,076 B2 | 7/2004 | Benicewicz et al. |
| 6,987,163 B2 | 1/2006 | Cabasso et al. |
| 7,148,311 B2 | 12/2006 | Shao et al. |
| 7,317,066 B2 | 1/2008 | Shao et al. |
| 7,332,552 B2 | 2/2008 | Li et al. |
| 7,661,542 B2 | 2/2010 | Baurmeister et al. |
| 7,696,302 B2 | 4/2010 | Calundann et al. |
| 7,736,778 B2 | 6/2010 | Uensal et al. |
| 7,736,779 B2 | 6/2010 | Uensal et al. |
| 7,745,030 B2 | 6/2010 | Uensal et al. |
| 7,820,314 B2 | 10/2010 | Calundann et al. |
| 7,837,763 B2 | 11/2010 | Uensal et al. |
| 8,142,917 B2 | 3/2012 | Uensal et al. |
| 8,277,983 B2 | 10/2012 | Calundann et al. |
| 8,323,810 B2 | 12/2012 | Calundann et al. |
| 8,518,743 B2 | 8/2013 | Tao et al. |
| 8,653,204 B2 | 2/2014 | Hua et al. |
| 8,716,356 B2 | 5/2014 | Calundann et al. |
| 8,796,372 B2 | 8/2014 | Nelson et al. |
| 8,865,796 B2 | 10/2014 | Benicewicz et al. |
| 9,109,070 B2 | 8/2015 | Benicewicz et al. |
| 9,130,219 B1 | 9/2015 | Huang et al. |
| 9,187,643 B2 | 11/2015 | Benicewicz et al. |
| 9,249,250 B2 | 2/2016 | Benicewicz et al. |
| 9,359,453 B2 | 6/2016 | Benicewicz et al. |
| 9,475,922 B2 | 10/2016 | Benicewicz et al. |
| 9,504,256 B2 | 11/2016 | Wang et al. |
| 9,598,541 B2 | 3/2017 | Benicewicz et al. |
| 9,683,055 B2 | 6/2017 | Benicewicz et al. |
| 9,732,169 B2 | 8/2017 | Wang et al. |
| 9,773,953 B2 | 9/2017 | Li et al. |
| 9,806,365 B2 | 10/2017 | Benicewicz et al. |
| 9,884,935 B2 | 2/2018 | Mohammadkhani et al. |
| 10,011,674 B2 | 7/2018 | Viswanath et al. |
| 10,090,550 B2 | 10/2018 | Cho et al. |
| 10,112,143 B2 | 10/2018 | Kumar et al. |
| 11,180,621 B2 * | 11/2021 | Murdock ............ H01M 8/1069 |
| 2004/0028976 A1 | 2/2004 | Cabasso et al. |
| 2005/0142411 A1 | 6/2005 | Aihara |
| 2005/0170252 A1 | 8/2005 | Aihara |
| 2005/0186480 A1 | 8/2005 | Aihara |
| 2005/0244694 A1 | 11/2005 | Kiefer et al. |
| 2007/0218334 A1 * | 9/2007 | Bonorand ............ H01M 8/1023 429/494 |
| 2008/0241627 A1 | 10/2008 | Kim et al. |
| 2009/0098437 A1 | 4/2009 | Choi et al. |
| 2011/0000615 A1 | 1/2011 | Larson et al. |
| 2011/0003234 A1 | 1/2011 | Martin et al. |
| 2011/0189484 A1 | 8/2011 | Hopkins et al. |
| 2012/0115050 A1 | 5/2012 | Kim et al. |
| 2012/0196188 A1 | 8/2012 | Zhang et al. |
| 2012/0201988 A1 * | 8/2012 | Hansen ................ B01D 69/04 428/36.91 |
| 2013/0183603 A1 | 7/2013 | Benicewicz et al. |
| 2014/0377687 A1 | 12/2014 | Miyake et al. |
| 2015/0295262 A1 | 10/2015 | Kunita et al. |
| 2016/0315343 A1 | 10/2016 | Kurungot et al. |
| 2017/0098845 A1 | 4/2017 | Kim et al. |
| 2018/0123155 A1 | 5/2018 | Benicewicz et al. |
| 2020/0087473 A1 | 3/2020 | Murdock et al. |
| 2020/0091536 A1 | 3/2020 | Benicewicz et al. |

FOREIGN PATENT DOCUMENTS

| | | |
|---|---|---|
| CN | 106750441 | 5/2017 |
| CN | 106750442 | 5/2017 |
| CN | 106784947 | 5/2017 |
| JP | 2016207608 | 12/2016 |
| KR | 20120061156 | 6/2012 |
| WO | WO 2005/014474 | 2/2005 |
| WO | WO 2008/060658 | 5/2008 |
| WO | WO 2011/151775 | 12/2011 |
| WO | WO 2013/108111 | 7/2013 |
| WO | WO 2014/111792 | 7/2014 |
| WO | WO 2014/111793 | 7/2014 |

OTHER PUBLICATIONS

Chan, et al. "Electrochemically Enabled Sustainability: Devices, Materials and Mechanisms for Energy Conversion" *CRC Press* (2014) p. 420.

Chang, et al. "One-Step Cationic Grafting of 4-Hydroxy-TEMPO and its Application in a Hybrid Redox Flow Battery with a Cross-linked PBI Membrane" *ChemSusChem* 10(16) (2017) pp. 3193-3197. (Abstract only).

Chen, et al. "High Temperature Creep Behavior of Phosphoric Acid-Polybenzimidazole Gel Membranes" *J. Polym. Sci. Part B: Polym. Phys.* 53 (2015) pp. 1527-1538.

Fishel, et al. "Solution Polymerization of Polybenzimidazole" *J. Polym. Sci. Part A: Polym. Chem.* 54 (2016) pp. 1795-1802.

Fishel, et al. "High Temperature Polymer Electrolyte Membrane Fuel Cells: Ch. 24—Electrochemical Hydrogen Pumping" *Springer Verlag* (2015) pp. 527-540.

Fishel, et al. "High Temperature Polymer Electrolyte Membrane Fuel Cells: Ch. 10—PBI Membranes Via the PPA Process" *Springer Verlag* (2015) pp. 217-238.

Garrick, et al. "Characterizing Voltage Losses in an SO$_2$ Depolarized Electrolyzer Using Sulfonated Polybenzimidazole Membranes" *J. Electrochem. Soc.* 164(14) (2017) pp. F1591-F1595.

Garrick, et al. "Polybenzimidazole Membranes for Hydrogen Production in the Hybrid Sulfur Electrolyzer" *ECS Transactions* 66(3) (2015) pp. 31-40.

Gokhale, et al. "Implementing PGM-free electrocatalysts in high-temperature polymer electrolyte membrane fuel cells" *Electrochem. Comm.* 93 (2018) pp. 91-94.

Gulledge, et al. "Investigation of Sequence Isomer Effects in AB-Polybenzimidazole Polymers" *J. Polym. Sci. Part A: Polym. Chem.* 52 (2014) pp. 619-628.

Gulledge, et al. "A New Sequence Isomer of AB-Polybenzimidazole for High-Temperature PEM Fuel Cells" *J. Polym. Sci. Part A: Polym. Chem.* 50 (2012) pp. 303-313.

Jang, et al. "Highly proton conductive, dense polybenzimidazole membranes with low permeability to vanadium and enhanced

(56) References Cited

OTHER PUBLICATIONS $H_2SO_4$ absorption capability for use in vanadium redox flow batteries" *J. Mater. Chem. A* 4(37) (2016) pp. 14342-14355.
Jayakody, et al. "NMR Studies of Mass Transport in High-Acid-Content Fuel Cell Membranes Based on Phosphoric Acid and Polybenzimidazole" *J. Electrochem. Soc.* 154(2) (2007) pp. B242-B246.
Li, et al. "Synthesis and Characterization of a New Fluorine-Containing Polybenzimidazole (PBI) for Proton-Conducting Membranes in Fuel Cells" *Fuel Cells* 13(5) (2013) pp. 832-842.
Li, et al. "Synthesis and properties of phenylindane-containing polybenzimidazole (PBI) for high-temperature polymer electrolyte membrane fuel cells (PEMFCs)" *J. Power Sources* 243 (2013) pp. 796-804.
Li, et al. "High temperature proton exchange membranes based on polybenzimidazoles for fuel cells" *Prog. Polym. Sci.* 34(5) (2009) pp. 449-477.
Luo, et al. "Porous poly(benzimidazole) membrane for all vanadium redox flow battery" *J. Power Sources* 312 (2016) pp. 45-54. (Abstract only).
Mader, et al. "Synthesis and Properties of Random Copolymers of Functionalised Polybenzimidazoles for High Temperature Fuel Cells" *Fuel Cells* 11(2) (2011) pp. 212-221.
Mader, et al. "Synthesis and Properties of Segmented Block Copolymers of Functionalised Polybenzimidazoles for High-Temperature PEM Fuel Cells" *Fuel Cells* 11(2) (2011) pp. 222-237.
Mader, et al. "Sulfonated Polybenzimidazoles for High Temperature PEM Fuel Cells" *Macromolecules* 43 (2010) pp. 6706-6715.
Mader, et al. "Polybenzimidazole/Acid Complexes as High-Temperature Membranes" *Adv. Polym. Sci.* 216 (2008) pp. 63-124.
Molleo, et al. "High Polymer Content 2,5-Pyridine-Polybenzimidazole Copolymer Membranes with Improved Compressive Properties" *Fuel Cells* 15(1) (2015) pp. 150-159.
Molleo, et al. "High Polymer Content 3,5-Pyridine-Polybenzimidazole Copolymer Membranes with Improved Compressive Properties" *Fuel Cells* 14(1) (2014) pp. 16-25.
Molleo, et al. "Encyclopedia of Sustainability Science and Technology: Ch. 13—Polybenzimidazole Fuel Cell Technology" *Springer Sci. Busi. Media* (2012) pp. 391-431.
Neutzler, et al. "Performance of vapor-fed direct dimethyl ether fuel cell utilizing high temperature polybenzimidazole polymer electrolyte membrane" *J. Power Sources* 216 (2012) pp. 471-474.
Noh, et al. "Vanadium Redox Flow Batteries Using meta-Polybenzimidazole-Based Membranes of Different Thicknesses" *ACS Appl. Mater. Interf.* 9(42) (2017) pp. 36799-36809.
Parasuraman, et al. "Review of material research and development for vanadium redox flow battery applications" *Electrochimica Acta* 101 (2013) pp. 27-40.
Peng, et al. "Thin skinned asymmetric polybenzimidazole membranes with readily tunable morphologies for high-performance vanadium flow batteries" *RSC Advances* 7 (2017) pp. 1852-1862.
Peng, et al. "A $H_3PO_4$ preswelling strategy to enhance the proton conductivity of a $H_2SO_4$-doped polybenzimidazole membrane for vanadium flow batteries" *RSC Advances* 6(28) (2016) pp. 23479-23488.
Perry, et al. "Advanced Redox-Flow Batteries: A Perspective" *J. Electrochem. Soc.* 163(1) (2016) pp. A5064-A5067.
Perry, et al. "A Comparative Study of Phosphoric Acid-Doped m-PBI Membranes" *J. Polym. Sci. Part B: Polym. Phys.* 52 (2014) pp. 26-35.
Prifti, et al. "Membranes for Redox Flow Battery Applications" *Membranes* 2 (2012) pp. 275-306.
Qian, et al. "Synthesis and Characterization of High Molecular Weight Hexafluoroisopropylidene-Containing Polybenzimidazole for High-Temperature Polymer Electrolyte Membrane Fuel Cells" *J. Polym. Sci. Part A: Polym. Chem.* 47 (2009) pp. 4064-4073.
Rastler, D. "Electrical energy storage technology options" *Electr. Power Res. Inst.* 1020676 (2010) pp. 1-161.

Razali, et al. "Exploring and Exploiting the Effect of Solvent Treatment in Membrane Separations" *ACS Appl. Mater. Interf.* 9 (2017) pp. 11279-11289.
Schönberger, et al. "Polybenzimidazole-Based Block Copolymers: From Monomers to Membrane Electrode Assemblies for High Temperature Polymer Electrolyte Membrane Fuel Cells" *J. Polym. Sci., Part A: Polym. Chem.* 55 (2017) pp. 1831-1843.
Seel, et al. "Polyphenylquinoxaline-based proton exchange membranes synthesized via the PPA Process for high temperature fuel cell systems" *J. Membr. Sci.* 405-406 (2012) pp. 57-67.
Seel, et al. "Handbook of Fuel Cells. Part II: Conductive membranes for low-temperature fuel cells: Ch. 19—High-temperature polybenzimidazole-based membranes" *John Wiley & Sons, Ltd.* (2009) pp. 1-13.
Shogbon, et al. "Determination of the Molecular Parameters and Studies of the Chain Conformation of Polybenzimidazole in DMAc/LiCl" *Macromolecules* 39 (2006) pp. 9409-9418.
Singh, et al. "Polybenzimidazole based random copolymers containing hexafluoroisopropylidene functional groups for gas separations at elevated temperatures" *Polymer* 119 (2017) pp. 134-141.
Skyllas-Kazacos, et al. "Vanadium Electrolyte Studies for the Vanadium Redox Battery—A Review" *ChemSusChem* 9(13) (2016) pp. 1521-1543.
Suarez, et al. "Multinuclear NMR Study of the Effect of Acid Concentration on Ion Transport in Phosphoric Acid Doped Poly(benzimidazole) Membranes" *J. Phys. Chem. B* 116 (2012) pp. 12545-12551.
Tang, et al. "Phosphoric acid-imbibed three-dimensional polyacrylamide/poly(vinyl alcohol) hydrogel as a new class of high-temperature proton exchange membrane" *J. Power Sources* 229 (2013) pp. 36-41.
Valtcheva, et al. "Crosslinked polybenzimidazole membranes for organic solvent nanofiltration (OSN): Analysis of crosslinking reaction mechanism and effects of reaction parameters" *J. Membr. Sci.* 493 (2015) pp. 568-579.
Wang, et al. "Sulfonated PBI Gel Membranes for Redox Flow Batteries" *J. Electrochem. Soc.* 166(8) (2019) pp. A1449-A1455.
Wang, et al. "Handbook of Thermoplastics: Ch. 19—Polybenzimidazoles" *CRC Press* (2015) pp. 617-667.
Xiao, et al. "High-Temperature Polybenzimidazole Fuel Cell Membranes via a Sol-Gel Process" *Chem. Mater.* 17 (2005) pp. 5328-5333.
Xiao, et al. "Synthesis and Characterization of Pyridine-Based Polybenzimidazoles for High Temperature Polymer Electrolyte Membrane Fuel Cell Applications" *Fuel Cells* 5(2) (2005) pp. 287-295.
Xie, et al. "Processing and Pretreatment Effects on Vanadium Transport in Nafion Membranes" *J. Electrochem. Soc.* 163(1) (2016) pp. A5084-A5089.
Yang, et al. "Fabrication of crosslinked polybenzimidazole membranes by trifunctional crosslinkers For high temperature proton exchange membrane fuel cells" *Intl. J. Hydrogen Energy* 43(6) (2018) pp. 3299-3307.
Yu, et al. "Synthesis of Poly (2,2'-(1,4-phenylene) 5,5'-bibenzimidazole) (para-PBI) and Phosphoric Acid Doped Membrane for Fuel Cells" *Fuel Cells* 9(4) (2009) pp. 318-324.
Yu, et al. "Synthesis and Properties of Functionalized Polybenzimidazoles for High-Temperature PEMFCs" *Macromolecules* 42 (2009) pp. 8640-8648.
Yuan, et al. "Advanced porous membranes with ultra-high selectivity and stability for vanadium flow batteries" *Energy Environ. Sci.* 9(2) (2016) pp. 269-272.
Zhang, et al. "Progress and prospects of next-generation redox flow batteries" *Energy Storage Mater.* 15 (2018) pp. 324-350.
Zhou, et al. "The use of polybenzimidazole membranes in vanadium redox flow batteries leading to increased coulombic efficiency and cycling performance" *Electrochimica Acta* 153 (2015) pp. 492-498.
EPO. "Extended European Search Report" Euro. Pat. Ofc. 19860913 (dated Jun. 23, 2022) pp. 1-8.

\* cited by examiner

LOW PERMEABILITY POLYBENZIMIDAZOLE (PBI) GEL MEMBRANES FOR REDOX FLOW BATTERIES

CROSS REFERENCE TO RELATED APPLICATION

This application claims filing benefit of U.S. Provisional Patent Application Ser. No. 62/731,152, titled "Low Permeability Polybenzimidazole (PBI) Gel Membranes for Flow Batteries," having a filing date of Sep. 14, 2018, which is incorporated herein by reference for all purposes.

FEDERAL RESEARCH STATEMENT

This invention was made with Government support under Grant No. DE-AR0000767, awarded by the Department of Energy. The Government has certain rights in the invention.

BACKGROUND

Increasing demands on the energy sector have created a new need for large-scale energy storage devices with additional implications in grid management and backup power coincidentally with the seamless integration of new renewable energy devices. Redox flow batteries have an as-yet unmet potential to efficiently store large amounts of energy as well as meet cost requirements for meeting such needs. Redox flow batteries perform charging and discharging by using a positive electrode electrolyte solution and a negative electrode electrolyte solution separated by an ion exchange membrane, each electrolyte solution containing metal ions (active materials) that form a redox pair (also referred to as a redox couple) by which valence is changed by oxidation-reduction.

Unfortunately, the widespread adoption of redox flow batteries has been limited by the high cost of device fabrication. For instance, in a vanadium redox flow battery (VRB) a major portion of the cost is attributed to the vanadium electrolyte. Such costs could be mitigated by reducing the size of the electrochemical stack. However, to accomplish this effectively and maintain high power densities the battery must be able to operate under high current loads for many cycles. Traditional membranes used in redox flow batteries (generally perfluorosulfonic acid membranes such as Nafion®) are poor ionic conductors and are unable to sustain operation under high current loads, and thus the batteries incorporating these membranes require larger cell stacks at higher costs. In an attempt to reduce costs of redox flow batteries and increase overall performance, there has been a surge in membrane development activities, with limited results.

The ion exchange membrane is a primary component of a redox flow battery and has an important effect upon the output, capacity, lifespan and cost of the battery. In addition to a requirement for low crossover of redox pair electrolyte ions as well as ability to function at high current loads, the ion exchange membrane must exhibit mechanical and chemical stability and high durability. The ion exchange membrane of a redox flow battery is always immersed in an electrolyte solution, and thus must be able to resist degradation due to oxidation or the like, and the durability of the membrane becomes a main factor determining the lifespan of a redox flow battery.

Certain types of phosphoric acid (PA) doped polybenzimidazole (PBI) membranes have been considered for use in a variety of electrical applications. Traditional PBI membranes are most notably known for their performance as high temperature polymer electrolyte membranes. Traditional PBI membranes have also been considered for multiple new devices, such as electrochemical hydrogen separation, $SO_2$ depolarized electrolyzers, and redox flow batteries. To date, research on PBI membranes for redox flow batteries has focused on the traditional meta-polybenzimidazole (m-PBI) and its derivatives. Traditional PBI membranes for use in electrochemical applications have been prepared by solution casting in N,N'-dimethylacetamide (DMAc) to form a dense film followed by imbibing the formed film in the desired electrolyte, coined the "conventional imbibing process." Unfortunately, these conventional PBI membranes have been shown to exhibit extremely low ionic conductivities when imbibed in electrolyte solutions (less than 20 mS-cm$^{-1}$) and an inability to operate at current loads above about 100 mA cm$^{-2}$. Moreover, the conventional imbibing process for traditional PBI membranes is a time consuming, environmentally unfriendly technique that adds cost to the membrane fabrication process.

More recently, a process to prepare PBI membranes has been developed that includes direct casting of a polymerization composition comprising the PBI polymer in polyphosphoric acid (PPA) solvent. Subsequent hydrolysis of the PPA solvent to PA, which is a poor solvent for PBI, induces solidification of the PBI membrane that is imbibed as-formed with PA.

What is needed in the art is an ion exchange membrane for a redox flow battery that exhibits low permeability to active redox species of the battery in conjunction with high ionic conductivity and that can operate under high current loads while also being highly stable and durable in the challenging environment of the redox flow battery.

SUMMARY

According to one embodiment, disclosed is a method for forming a redox flow battery membrane. The method can include forming a polymerization composition, the polymerization composition including a polyphosphoric acid (PPA), an aromatic or heteroaromatic tetraamino compound, and an aromatic or heteroaromatic carboxylic acid compound. The aromatic carboxylic acid compound can be an aromatic or heteroaromatic polycarboxylic acid or ester, anhydride, or acid chloride thereof or an aromatic or heteroaromatic diaminocarboxylic acid. The method also includes polymerizing the compounds of the polymerization composition, e.g., via heating, to effect polymerization of the compounds and formation of a polybenzimidazole (PBI) solution.

Following polymerization, the PBI solution can be shaped to form a membrane precursor and the PPA of the solution can be hydrolyzed, thereby forming phosphoric acid (PA) and water and solidifying the polymer of the membrane precursor to form a PBI gel membrane imbibed with PA and water. The PBI gel membrane differs from previously known traditional PBI membranes, as it can incorporate high liquid content and retain structure, i.e., capable of maintaining a self-supporting structure even at a low solids content of, e.g., about 40 wt. % or less.

The method can also include processing the gel membrane to densify the gel membrane and form a densified PBI gel membrane or a dried PBI film. Following densification, a method can include re-swelling the PBI film by imbibing the PBI film with a redox flow battery supporting electrolyte, one example of which being sulfuric acid.

Also disclosed is a redox flow battery membrane that includes a densified PBI gel membrane and a redox flow battery supporting electrolyte imbibed in the densified PBI gel membrane. The redox flow battery membrane can exhibit a high ionic conductivity, e.g., about 50 mS/cm or higher, and can also exhibit a low permeability to $VO^{2+}$ ions, for instance about $10^{-7}$ cm$^2$/s or less.

Redox flow batteries incorporating the densified PBI gel membranes are also described. A redox flow battery can include a densified PBI gel membrane as described separating an anolyte solution and a catholyte solution and can operate at high current densities, e.g., about 50 mA/cm$^2$ or greater with low crossover of redox couple ions. A redox flow battery can include other battery components as are known in the art (e.g., electrodes, current collectors, flow lines, etc.) and can include a single cell or multiple cells in a single cell stack or multiple cell stacks.

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Figure 1:
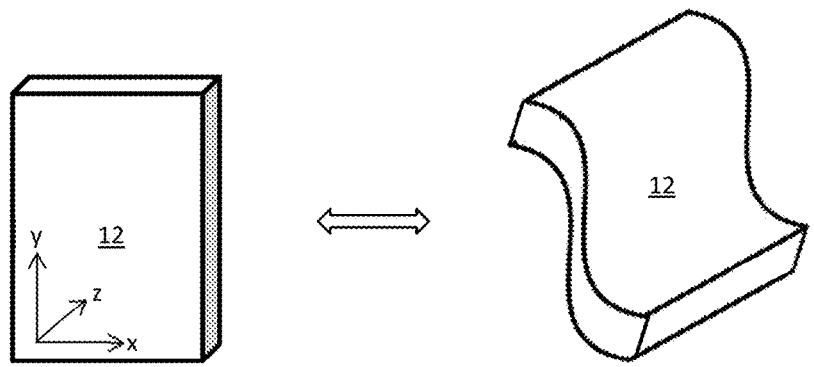
FIG. 1 defines dimensions of a membrane utilized in this disclosure.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

The present disclosure is generally directed to redox flow battery ion exchange membranes, methods for forming the membranes, and redox flow batteries incorporating the membranes. The redox flow battery membranes are based upon polybenzimidazole (PBI) membranes, and more specifically, PBI gel membranes. As utilized herein, the term "gel" generally refers to a polymeric matrix that can incorporate a high liquid content and maintain a self-supporting structure. For instance, a PBI gel membrane as described herein can incorporate about 60 wt. % or more, about 65 wt. % or more, about 75 wt. % or more, about 80 wt. % or more, or about 85 wt. % or more liquid by weight of the composite membrane (total solids plus liquid content) without loss of structure of the polymeric matrix. In one embodiment, a PBI gel membrane can incorporate from about 60 wt. % to about 95 wt. % liquid while maintaining a self-supporting, semi-rigid structure, i.e., capable of being manipulated and exhibiting pliability without loss of structure of the polymeric matrix as indicated in FIG. 1 which illustrates a membrane 12 as described herein in both a flat and slightly warped configuration. In addition, a PBI gel can be processed to remove liquid from the gel and then re-imbibed with a liquid to re-swell without loss of structure of the polymeric matrix.

The redox flow battery membranes can exhibit low permeability to redox couple ions while maintaining high ionic conductivity, allowing for formation of batteries that can operate under high current load conditions with high performance, which can translate to redox flow batteries with smaller and less costly electrochemical stacks providing the same or better performance as compared to current technologies. For instance, a redox flow battery membrane as described can exhibit a permeability to a member of a redox couple, e.g., $VO^{2+}$ or $VO^{4+}$, of about $10^{-7}$ cm$^2$/s or less, such as about $5 \times 10^{-8}$ cm$^2$/s or less, about $10^{-8}$ cm$^2$/s or less, or about $5 \times 10^{-9}$ cm$^2$/s or less in some embodiments.

Beneficially, the redox flow battery membrane can exhibit low redox couple crossover characteristics while maintaining electrochemical activity. For instance, a redox flow battery membrane as described can exhibit an in-plane ionic conductivity in a 2.6 M sulfuric acid solution of about 50 mS/cm, or even higher in some embodiments, e.g., about 100 mS/cm or about 200 mS/cm in some embodiments.

In addition, batteries incorporating disclosed membranes can operate at high current density, for instance about 50 mA/cm$^2$ or higher, e.g., from about 100 mA/cm$^2$ to about 500 mA/cm$^2$ in some embodiments. Moreover, batteries incorporating the redox flow battery membranes can operate at high efficiency. By way of example, at a current density of 242 mA/cm$^2$ a battery incorporating a membrane as described can exhibit a coulombic efficiency (CE) of about 90% or greater, for instance from about 94% to about 99% in some embodiments; an energy efficiency (EE) of about 70% or greater, for instance from about 73% to about 84% in some embodiments; and a voltage efficiency (VE) of about 75% or greater, for instance from about 78% to about 80%. At a current density of 483 mA/cm$^2$ a battery incorporating a membrane as described can exhibit a CE of 85% or greater, for instance from about 87% to about 99% in some embodiments; an EE of about 50% or greater, for instance from about 54% to about 75% in some embodiments; and a VE of about 60% or greater, for instance from about 62% to about 77%.

The performance characteristics of the disclosed redox flow battery membranes are based on the use of densified PBI gel membranes. The cells that incorporate the membranes are much improved as compared to cells incorporating ion exchange membranes based upon conventional PBI polymer membranes, which exhibit very low ionic conductivities, e.g., less than 20 mS/cm. Moreover, batteries that incorporate conventional PBI polymer membranes are unable to function at current densities above about 80 mA/cm$^2$. Without wishing to be bound to any particular theory, it is believed that the excellent characteristics of the disclosed redox flow battery membranes are due to the morphology of the polymeric matrix that forms the membrane structure. As described further herein, the disclosed PBI membranes are formed according to a method that includes hydrolysis of the PPA polymer solvent and the subsequent solidification of the PBI polymer in the hydrolysis product (PA) followed by densification of the gel membrane thus formed. It is believed that this initial in situ hydrolysis and polymer solidification leads to formation an ordered polymeric matrix that differs in molecular structure from the traditional, organic solution-cast PBI membranes that are cast as a solution of an organic solvent followed by solidification by removal of the organic solvent via, e.g., heating. In particular, it is believed that the PBI gel membrane structure includes a more open and ordered framework as compared to traditional PBI membranes, with the framework of the PBI matrix providing a stable gel membrane that exhibits the improved electrochemical properties as described. Upon densification of the gel membrane, e.g., through decrease of the membrane thickness and/or drying to form a PBI film, the porosity of the membrane to large redox couple ions can be decreased without destruction of the originally formed framework of the matrix. As such, upon imbibing a PBI film with a redox flow battery supporting electrolyte, the re-swollen membranes can retain desirable electrochemical functionality and ionic conductivity while exhibiting a decreased permeability to the large ions of the active redox couple species in the electrolyte solutions.

In addition to highly desirable electrochemical characteristics, the redox flow battery membranes based on PBI polymers are highly resistant to degradation in the redox flow battery environment. For instance, disclosed membranes can show little or no degradation in oxidative vanadium solutions. As such, disclosed membranes can provide long-term activity, further reducing costs of redox flow batteries that incorporate the membranes.

To form a redox flow battery membrane, a polymerization composition can be formed that includes PPA and the PBI-forming compounds of choice, e.g., PBI-forming monomers. The monomer content of the polymerization composition can generally be low, for instance about 10 wt. % or less, about 8 wt. % or less, or about 5 wt. % or less in some embodiments.

The PBI polymer of the PBI gel membrane can have any PBI structure as is generally known in the art and can be formed by polymerization of PBI-forming compounds including at least one aromatic or heteroaromatic tetraamino compound and at least one aromatic or heteroaromatic polycarboxylic acid or ester, anhydride, or acid chloride thereof or at least one aromatic or heteroaromatic diaminocarboxylic acid. Heteroaromatic compounds encompassed herein include aromatic systems that contain at least one nitrogen, oxygen, sulfur or phosphorus atom in an aromatic ring.

Examples of aromatic and heteroaromatic tetraamino compounds as may be utilized in forming the PBI gel membrane can include, without limitation, 2,3,5,6-tetraminopyridine; 3,3',4,4'-tetraminodiphenylsulfone; 3,3',4,4'-tetraminodiphenyl ether; 3,3',4,4'-tetraminobiphenyl; 1,2,4,5-tetraminobenzene; 3,3',4,4'-tetraminobenzophenone; 3,3',4,4'-tetraminodiphenylmethane; and 3,3',4,4'-tetraminodiphenyldimethyl-methane and the salts thereof, e.g., the mono-, di-, tri- and tetrahydrochloride salts, as well as any combination of aromatic or heteroaromatic tetraamino monomers.

In one embodiment, an aromatic polycarboxylic acid can include a dicarboxylic acid. A dicarboxylic acid can be utilized alone or in combination with one or more additional polycarboxylic acid compounds, e.g., tricarboxylic acids and/or tetracarboxylic acids. When incorporated, the content of tricarboxylic acid or tetracarboxylic acids can generally be about 30 mol % or less, for instance from about 0.1 mol % to about 20 mol %, or from about 0.5 mol % to about 10 mol % based on the amount of the dicarboxylic acid compound used. An ester of a polycarboxylic acid can be utilized such as C1-C20-alkyl esters or C5-C12-aryl esters of a polycarboxylic acid. An anhydride of a polycarboxylic acid or an acid chloride of a polycarboxylic acid can be polymerized according to disclosed methods.

Examples of aromatic dicarboxylic acids can include, without limitation, pyridine-2,5-dicarboxylic acid; pyridine-3,5-dicarboxylic acid; pyridine-2,6-dicarboxylic acid; pyridine-2,4-dicarboxylic acid; 4-phenyl-2,5-pyridinedicarboxylic acid; 3,5-pyrazoledicarboxylic acid; 2,6-pyrimidinedicarboxylic acid; 2,5-pyrazinedicarboxylic acid; 2,4,6-pyridinetricarboxylic acid; benzimidazole-5,6-dicarboxylic acid; 5-hydroxyisophthalic acid; 4-hydroxyisophthalic acid; 2-hydroxyterephthalic acid; 5-aminoisophthalic acid; 5-N,N-dimethylaminoisophthalic acid; 5-N,N-diethylaminoisophthalic acid; 2,5-dihydroxyterephthalic acid; 2,6-dihydroxyisophthalic acid; 4,6-dihydroxyisophthalic acid; 2,3-dihydroxyphthalic acid; 2,4-dihydroxyphthalic acid; 3,4-dihydroxyphthalic acid; 1,8-dihydroxynaphthalene-3,6-dicarboxylic acid; diphenylsulfone-4,4'-dicarboxylic acid; isophthalic acid; terephthalic acid; phthalic acid; 3-fluorophthalic acid; 5-fluoroisophthalic acid; 2-fluoroterephthalic acid; tetrafluorophthalic acid; tetrafluoroisophthalic acid; tetrafluoroterephthalic acid; 3-sulfophthalic acid; 5-sulfoisophthalic acid; 2-sulfoterephthalic acid; tetrasulfophthalic acid; tetrasulfoisophthalic acid; tetrasulfoterephthalic acid; 1,4-naphthalenedicarboxylic acid; 1,5-naphthalenedicarboxylic acid; 2,6-naphthalenedicarboxylic acid; 2,7-naphthalenedicarboxylic acid; diphenic acid; diphenyl ether 4,4'-dicarboxylic acid; benzophenone-4,4'-dicarboxylic acid; biphenyl-4,4'-dicarboxylic acid; 4-trifluoromethylphthalic acid; 2,2-bis(4-carboxyphenyl)hexafluoropropane; 4,4'-stilbenedicarboxylic acid; and 4-carboxycinnamic acid or any combination thereof.

Examples of aromatic tricarboxylic acids and esters, acid anhydrides, and acid chlorides thereof include, without limitation, 1,3,5-benzenetricarboxylic acid (trimesic acid); 1,2,4-benzenetricarboxylic acid (trimellitic acid); (2-carboxyphenyl)iminodiacetic acid; 3,5,3'-biphenyltricarboxylic acid; and 3,5,4'-biphenyltricarboxylic acid; or any combination thereof.

Examples of aromatic tetracarboxylic acids and esters, acid anhydrides, and acid chlorides thereof include, without limitation, 3,5,3',5'-biphenyltetracarboxylic acid; benzene-1,2,4,5-tetracarboxylic acid; benzophenonetetracarboxylic acid; 3,3',4,4'-biphenyltetracarboxylic acid; 2,2',3,3'-biphenyltetracarboxylic acid; 1,2,5,6-naphthalenetetracarboxylic acid; and 1,4,5,8-naphthalenetetracarboxylic acid; or any combination thereof.

Heteroaromatic carboxylic acids can include heteroaromatic dicarboxylic acids, heteroaromatic tricarboxylic acids and heteroaromatic tetracarboxylic acids, including their respective esters such as C1-C20-alkyl esters, C5-C12-aryl esters, or the acid anhydrides or the acid chlorides of the heteroaromatic carboxylic acids. Examples of heteroaromatic carboxylic acids include, without limitation, pyridine-2,5-dicarboxylic acid; pyridine-3,5-dicarboxylic acid; pyridine-2,6-dicarboxylic acid; pyridine-2,4-dicarboxylic acid; 4-phenyl-2,5-pyridinedicarboxylic acid; 3,5-pyrazoledicarboxylic acid; 2,6-pyrimidinedicarboxylic acid; 2,5-pyrazinedicarboxylic acid; 2,4,6-pyridinetricarboxylic acid; benzimidazole-5,6-dicarboxylic acid; and also their C1-C20-alkyl esters or their C5-C12-aryl esters, or their acid anhydrides or their acid chlorides, or any combination thereof.

In one embodiment, the polymerization composition can include a diaminocarboxylic acid, examples of which include, without limitation, diaminobenzoic acid and the mono and dihydrochloride derivatives of said acid, as well as 1,2-diamino-3'-carboxy acid 4,4'-diphenyl ether, or any combination thereof.

PPA as can be utilized in the polymerization composition can be commercial PPA as obtainable, for example, from Riedel-de Haen. PPA can include concentrated grades of PA ($H_3PO_4$) above 100%. At high concentrations, the individual $H_3PO_4$ units are polymerized by dehydration and the PPA can be expressed by the formula $H_{n+2}P_nO_{3n+1}$ (n>1).

The PPA [$H_{n+2}P_nO_{3n+1}$ (n>1)] can have a $P_2O_5$ content as calculated by acidimetry of about 70 wt. % or more, for instance about 75 wt. % or more, or about 82 wt. % or more, for instance from about 70 wt. % to about 86 wt. % in some embodiments. The polymerization composition can be in the form of a solution of the monomers/compounds, or a dispersion/suspension of the monomers/compounds in the PPA, generally depending upon the nature of the compounds to be polymerized and any additional components of the polymerization solution.

The polymerization can be carried out at a temperature and for a time until suitable polymerization of the compounds has taken place, which can generally be determined by an increase in viscosity of the polymerization composition. The increase in viscosity can be determined by visual inspection, through determination of the intrinsic viscosity, or by any other suitable means. For instance, the polymerization can continue until the polymerization composition exhibits an intrinsic viscosity of about 0.8 dL/g or greater, for instance about 1.0 dL/g or greater, or about 1.5 dL/g or greater, in some embodiments. The polymerization temperature can generally be about 220° C. or less, for instance about 200° C. or less, such as about 100° C. to 195° C. in some embodiments. The polymerization can be carried out over a time of from a few minutes (e.g., about 5 minutes) up to several hours (e.g., about 100 hours). In one embodiment, the polymerization composition can be heated in a stepwise fashion, for instance in three or more steps, each step lasting from about 10 minutes to about 5 hours and increasing the temperature by about 15° C. or more for each step. Of course, the particular polymerization conditions can be varied, depending generally upon the reactivity and concentration of the particular monomers, as would be evident to one of skill in the art, and no particular polymerization conditions are required in formation of the redox flow battery membranes.

Exemplary PBI polymer repeating units of a PBI gel membrane can include, without limitation:

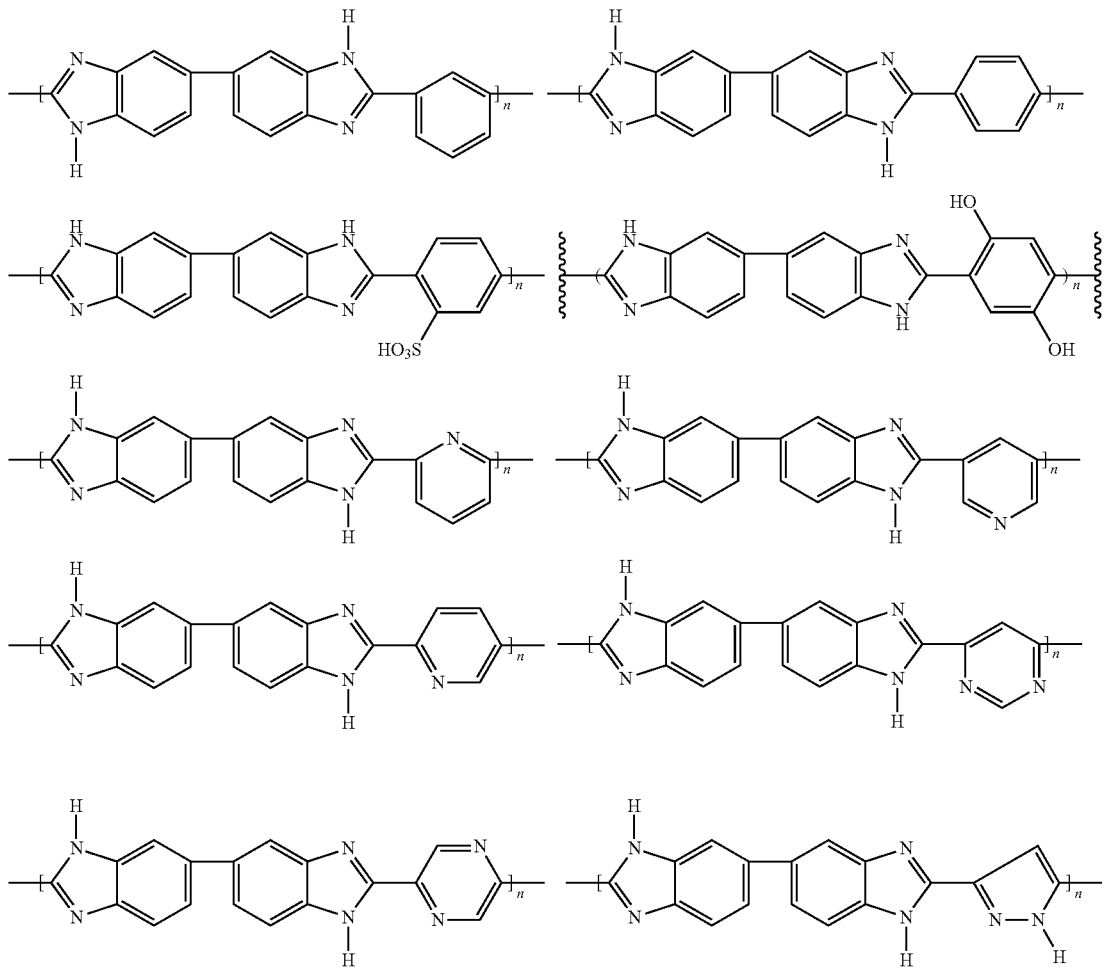

-continued
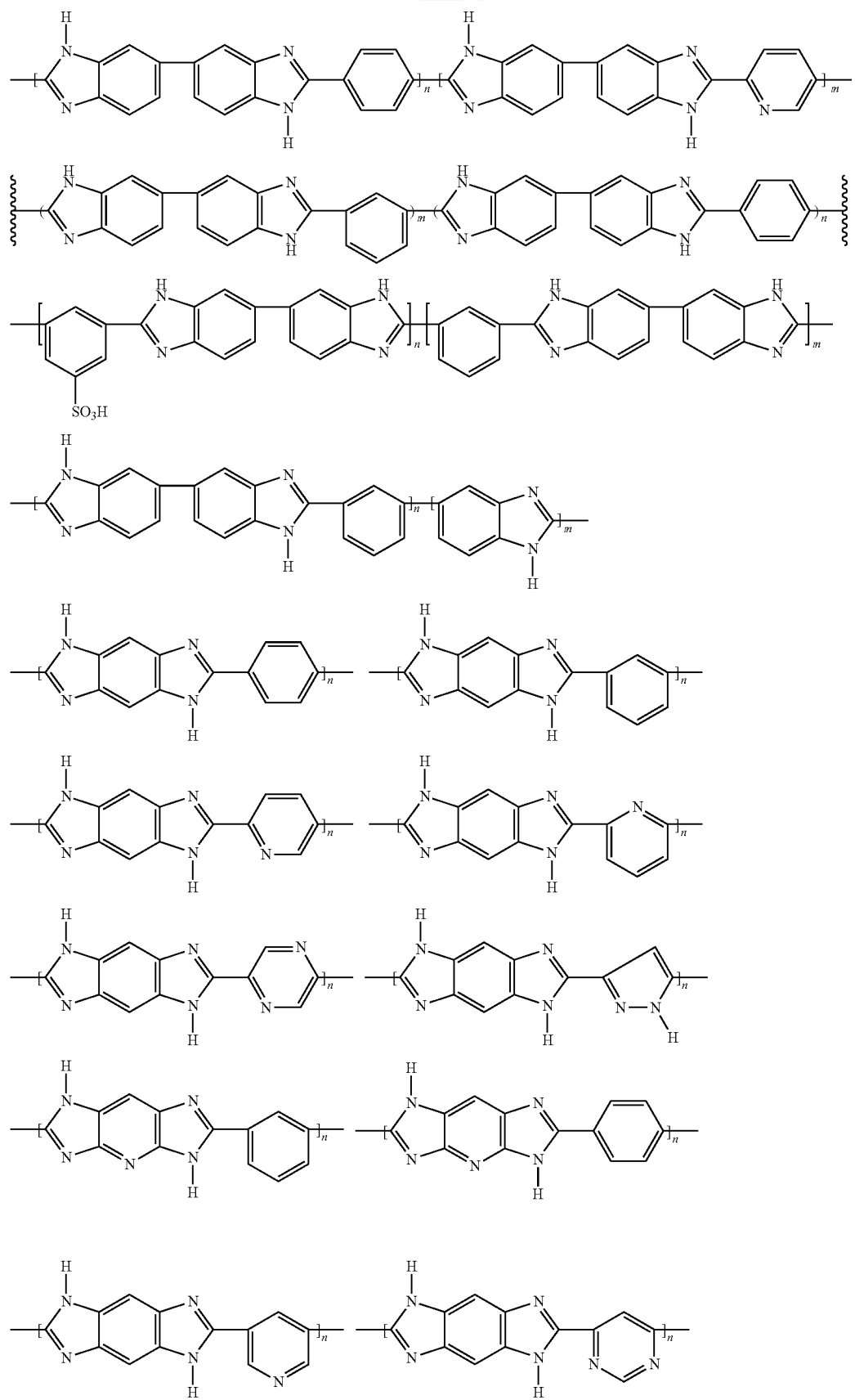

-continued

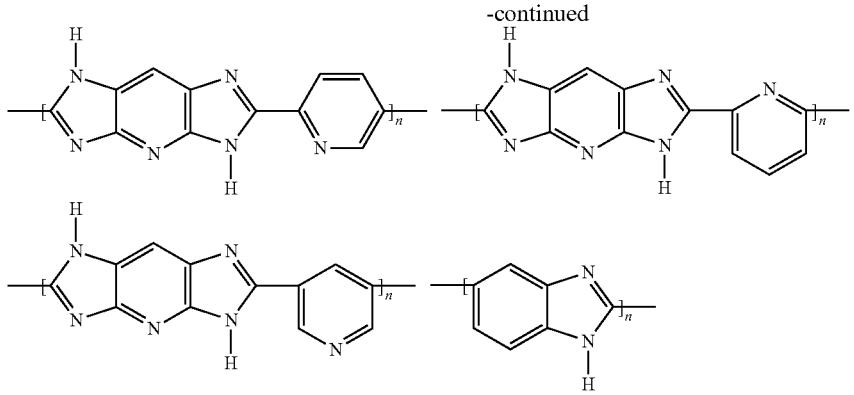

or any combination thereof, in which n and m are each independently 1 or greater, about 10 or greater, or about 100 or greater, in some embodiments.

A PBI polymer of a membrane as disclosed herein can include any repeating unit including any derivatization thereof as is generally known in the art, examples of which are well within the knowledge of one of skill in the art, representative examples of which have been described, for instance in US Patent Application Publication No. 2013/0183603 to Benicewicz, et al., which is incorporated by reference herein.

Following polymerization, the polymer can be in solution in the PPA solvent, and the PBI polymer solution can be processed to form a gel membrane precursor having a desired thickness. Beneficially, the polymer solution, as well as the gel membrane precursor and eventual gel membrane and redox flow battery membrane formed of the polymer solution, can be free of organic solvents.

The membrane precursor can be formed according to any suitable formation process, such as, and without limitation to, casting, spray coating, knife coating, etc. For instance, the gel membrane precursor can be formed to a thickness of from about 20 micrometers (μm) to about 4,000 μm in one embodiment, such as from about 30 μm to about 3,500 μm, or from about 50 μm to about 1,000 μm, in some embodiments.

To solidify the polymer of the membrane precursor and form the PBI gel membrane, the PBI polymer solution can be treated in the presence of water and/or moisture to hydrolyze at least a portion of the PPA of the solution. Upon hydrolysis, the PPA will hydrolyze to form PA and water, thereby causing a sol-gel transfer of the PBI polymer solution and solidification of the polymer, as the PBI polymer is less soluble in PA as compared to PPA.

The hydrolysis treatment can be carried out at temperatures and for a time sufficient for the gel membrane to solidify so as to be self-supporting and capable of being manipulated without destruction while incorporating high liquid content (e.g., about 60 wt. % or higher liquid content of the total solid and liquid content of the membrane). By way of example, the hydrolysis treatment can be carried out at a temperature of from about 0° C. to about 150° C., for instance from about 10° C. to about 120° C., or from about 20° C. to about 90° C., e.g., at ambient temperature in some embodiments (e.g., at a relative humidity contacting environment of from about 35% to 100%).

The hydrolysis can be carried out by contact of the gel membrane precursor with $H_2O$, for instance in the form of a liquid or vapor, and/or in the presence of other components. For instance, the gel membrane precursor can be contacted with water vapor and/or liquid water and/or steam and/or aqueous PA (e.g., a PA solution having a PA concentration of from about 10 wt. % to about 90 wt. %, e.g., about 30 wt. % to about 70 wt. % or about 45 wt. % to about 55 wt. %). The treatment can be carried out under standard pressure, but this is not a requirement of a formation process, and in some embodiments, the hydrolysis treatment can be carried out under modified pressure.

In one embodiment, the hydrolysis can be carried out in a climate-controlled environment in which the $H_2O$ content can be tightly controlled. For example, the moisture content of the local environment can be controlled through control of the temperature or saturation of the fluid contacting the precursor membrane. For example, carrier gases such as air, nitrogen, carbon dioxide or other suitable gases can carry $H_2O$ (e.g., steam) in a controlled amount for contact with the precursor membrane.

The hydrolysis treatment time can generally vary depending upon parameters such as, e.g., $H_2O$ content and form of the contact, membrane thickness, contact temperature, etc. In general, the hydrolysis treatment can be carried out in a time period of between a few seconds to a few minutes, for instance when the hydrolysis treatment utilizes superheated steam, or alternatively over a period of several days, for example when the hydrolysis treatment is carried out at ambient temperature and low relative atmospheric moisture. In some embodiments, the hydrolysis treatment can be carried out over a period of time between about 10 seconds and about 300 hours, for instance from about 1 minute to about 200 hours. By way of example, in an embodiment in which the at least partial hydrolysis of the PPA of the PBI polymer solution is carried out at room temperature (e.g., about 20° C.) with ambient air of relative atmospheric moisture (i.e., relative humidity) content of from about 20% to 100%, for instance from about 40% to about 80%, the treatment time can generally be between about 5 hours and about 200 hours.

Upon hydrolysis of at least a portion of the PPA of the PBI polymer solution, the polymer can solidify, which form a PBI gel membrane. A PBI gel membrane can in one embodiment have a thickness of from about 15 μm to about 3000 μm, for instance from about 20 μm to about 2000 μm, or from about 20 μm to about 1500 μm, though any particular membrane thickness is not critical. In some embodiments, the PBI gel membrane can have a thickness that is less than that of the membrane precursor. As previously discussed, following hydrolysis, the PBI gel membrane can be self-supporting, even at high liquid content, which is believed to be due to the intra- and intermolecular polymer structures present in the solidified polymeric matrix.

The as-formed PBI gel membrane can in one embodiment have PBI solids content of from about 5 wt. % to about 40 wt. %, for instance from about 8 wt. % to about 30 wt. %, or from about 10 wt. % to about 25 wt. % of the total weight of the membrane including liquid content. The as-formed PBI gel membrane can be self-supporting, for instance having a Young's modulus of about 2.0 MPa or greater, for instance about 3.0 MPa or greater, or about 4.5 MPa or greater in some embodiments as determined for a PBI gel membrane having a thickness of 0.43 mm and a PBI content of 5 wt. % (e.g., polybenzimidazole).

To form the redox flow battery membrane from the PBI gel membrane, the PBI gel membrane can be densified and PA and PPA incorporated in the membrane can be removed and replaced with a redox flow battery supporting electrolyte. In one embodiment, the PBI gel membrane can be processed to remove PA and PPA incorporated in the gel membrane prior to the densification process. In other embodiments, the PBI gel membrane can be subjected to a densification process prior to removal of the PA and PPA.

The manner of removing PA and PPA from the membrane is not particularly limited. For instance, the PBI gel membrane can be simply washed with water several times to remove any PA and PPA remaining in the gel membrane. For example, the PBI gel membrane can be soaked in a series of water baths, each bath retaining the PBI gel membrane for a period of time from a few minutes (e.g., about 5 minutes) to several hours (e.g., about 24 hours). Optionally, the baths can be heated, for instance to a temperature of from about 20° C. to about 150° C., for instance from about 25° C. to about 90° C., though in other embodiments, the membrane can be rinsed at ambient temperature, with no particular temperature control. To confirm removal of the PA and PPA, the pH of the wash solution can be determined, and washing/rinsing can continue until the pH of the wash solution is neutral.

A PBI gel membrane can be densified according to any suitable methodology. As utilized herein, the term "densify" generally refers to any process that decreases a molecular porosity of the membrane. A densification process will generally be accompanied by a permanent decrease in at least one dimension of the membrane upon re-swelling of the membrane to a similar liquid content following the densification process. For example, following densification, a membrane that is fully incorporated with a liquid (i.e., cannot absorb any additional liquid) can exhibit a decrease in a dimension (e.g., thickness) as compared to the fully liquid incorporated membrane prior to densification. As utilized herein, the term "thickness" generally refers to the dimension of a membrane 12 in the z direction as illustrated in FIG. 1.

Beneficially, PBI gel membranes can be densified without altering the basic morphology of the polymeric matrix of the membrane that is formed according to the gel formation process. As such, the membranes can exhibit decreased porosity to large ions, and in particular redox couple ions as can be found in a redox flow battery, with little or no decrease in ionic conductivity of the membranes. This can provide for formation of redox flow batteries that can exhibit high current densities and low redox couple crossover.

The manner of densifying a gel membrane is not particularly limited. For instance, in one embodiment, a densification process can include actively stretching a gel membrane in one or more directions of the membrane surface (i.e., as defined by the x, y plane as illustrated in FIG. 1). In a stretching densification process, the gel membrane can be actively stretched up to any amount up to rupture of the membrane structure. For instance, a gel membrane can be stretched to about 200%, to about 190%, to about 180%, to about 170%, to about 160%, or to about 150% of the original dimension in one or more directions of the x, y plane of the membrane, for instance, from about 110% to about 200%, or from about 120% to about 190%, in some embodiments.

In other embodiments, a membrane can be densified without active stretching of the membrane. For instance, a membrane can be retained in one or more dimensions of the membrane surface (e.g., the x direction, the y direction or any angle of the x, y plane as defined in FIG. 1 or combination of surface dimensions) while liquid is removed from the membrane, which can densify the membrane. By way of example, a relatively small membrane can be retained on two opposite sides or alternatively on all four sides while liquid is removed from the membrane, which can densify the membrane. In another embodiment, a membrane can be in the form of an essentially endless sheet, e.g., on a roll, and the membrane can be retained on the opposing sides (e.g., in the cross direction) and optionally held under tension along at least a portion of the length of the sheet (e.g., in the machine direction) while liquid is removed from the membrane, which can densify the membrane.

Optionally, pressure can be applied to a membrane surface (in the z direction) during a densification process. For instance, pressure can be applied to a membrane surface by sandwiching the membrane between substrates and liquid can be removed from the membrane while the membrane is retained in at least one surface direction so as to densify the membrane. In such embodiments, the sandwiching substrates can allow for liquid to drain away from the membrane as it is densified. For instance, at least one of the substrates can define pores, channels, or the like to allow liquid to drain from the membrane. Alternatively, liquid can simply drain from the edges of the membrane between the pressing substrates.

Removal of liquid from a gel membrane during a densification process can be an active or passive liquid removal or some combination of both. For example, simply holding a membrane in an ambient atmosphere while the membrane is retained in one or more surface dimensions can passively remove liquid and densify the membrane. Similarly, in those embodiments in which a membrane is stretched in one or more surface dimensions as well as those embodiments in which pressure is applied across a surface of a membrane, liquid will be removed from the gel membrane merely by the stretching/pressing action carried out on the membrane.

In some embodiments, a membrane can be processed through the addition of heat, contact with a relatively dry gaseous stream, e.g., air, nitrogen, argon, etc. or combinations thereof, to actively remove liquid from the gel membrane. Moreover, active removal of liquid from the membrane can be carried out in conjunction with stretching/pressing the membrane or simply while the membrane is retained in one or more directions of the membrane surface.

The amount of liquid to be removed from the membrane can be such that the membrane becomes dry, i.e., no additional liquid beyond that due to the surrounding atmosphere, to form a PBI film. As utilized herein, the term "film" generally refers to a polymeric structure that is significantly smaller in thickness (the z direction) as compared to the surface dimensions (the x, y plane) and that incorporates little or no moisture, e.g., about 5 wt. % or less moisture within the polymeric matrix. In one embodiment, densification of the membrane can include removal of a significant portion of the liquid of the gel membrane, but not necessarily to the point of being considered "dry." For instance, about 50 wt. % or more, about 60 wt. % or more, about 70 wt. % or more, or about 80 wt. % or more of the liquid content of the gel membrane can be removed during a densification process.

A densification process can be carried out as a single-step or a multi-step process. By way of example, a multi-step process can include a first step during which a membrane can be stretched in one or more directions of a membrane surface and/or during which pressure can be applied to a surface area across the membrane thickness followed by a second step during which a membrane can be retained in one or more dimensions while liquid is actively or passively removed from the membrane. A single step process can include only stretching or pressing a membrane or alternatively stretching, pressing, or simply retaining a membrane in one or more dimensions in conjunction with active or passive removal of liquid from the membrane. Any combination of liquid removal, stretching, pressing, and retaining a membrane in one or more dimensions can be utilized individually or in combination and in a single or in multiple steps to densify a membrane.

Optionally, the PBI membrane can be crosslinked, which can decrease the permeability of the membrane to redox pair ions of the battery electrolyte solutions without strongly affecting the desirable electrochemical characteristics of the membranes. The manner of crosslinking as well as the point in the formation process at which the membrane is crosslinked is not particularly limited. For instance, the gel membrane can be crosslinked prior to rinsing/washing of the as-formed gel membrane or following rinsing/washing of the as-formed gel membrane to remove PA and PPA and prior to densification of the membrane. In other embodiments, the membrane can be crosslinked following densification and imbibing of the membrane/film with the supporting electrolyte.

In one embodiment, the PBI membrane can be crosslinked simply by heating in the presence of atmospheric oxygen. Crosslinking can also be effected by the action of radiation, e.g., infrared (IR) radiation (having a wavelength of from about 700 nm to about 1 mm) including near IR (radiation having a wavelength of from about 700 to about 2000 nm or an energy in the range from about 0.6 to about 1.75 eV).

To effect crosslinking, the PBI polymer can incorporate reactive functionality on the polymer chains so as to crosslink with itself or alternatively in conjunction with a crosslinking agent, i.e., a polyfunctional compound that can react with one or more functionalities of the PBI polymer (e.g., amines). Crosslinking agents can include any suitable functionality to effect crosslinking. Suitable crosslinking agents are not particularly limited, examples of which can include, without limitation, epichlorohydrin, diepoxides, diisocyanates, α,ω-dihaloalkanes, diacrylates, and bisacrylamides, particular examples of which can include, without limitation, α,α'-dichloro-p-xylene, chloromethyl methyl ether, bis(chloromethyl) ether, terephthaloyl chloride, succinyl chloride, and dimethyl succinate, as well as combinations of crosslinking agents. In one embodiment, from 1 to 20 equivalents of crosslinking agent can be utilized per available aromatic ring, but crosslinked embodiments of the membranes are not limited to any particular crosslink density.

To form the redox flow battery membrane, the membrane/film can be imbibed with a supporting electrolyte following densification. The supporting electrolyte of choice can generally depend upon the particular characteristics of the redox flow battery in which the membrane is to be employed, and can include acidic supporting electrolytes, basic supporting electrolytes, as well as neutral species (e.g., water). For instance, the membrane/film can be imbibed with a mineral acid (e.g., a strong inorganic acid) such as hydrochloric acid, nitric acid, fluorosulfonic acid, or sulfuric acid, or a mixture thereof, or a strong organic acid such as acetic acid, formic acid, p-toluene sulfonic acid, or trifluoromethane sulfonic acid or mixtures thereof, as well as mixtures of different types of acids, e.g., a combination of a mineral acid and an organic acid. Other examples of supporting electrolytes that can be imbibed in the membrane can include, without limitation, sodium chloride, potassium chloride, sodium hydroxide, potassium hydroxide, sodium sulfide, potassium sulfide, and combinations thereof. By way of example, a supporting electrolyte can include $H_2SO_4$, HBr, HBr/HCl mixtures, HCl, $NaS_2$, $NaS_2$/NaBr mixtures, $Br_2$ in HBr, $Br_2$ in $H_2SO_4$, $Br_2$ in HBr/$H_2SO_4$ mixtures, etc. Tetraalkylammonium supporting cations can be imbibed in the membranes in one embodiment, with $Et_4N^+$ and $Bu_4N^+$ being two non-limiting examples. A solution of a tetrafluoroborate ($BF^{4-}$), perchlorate ($ClO^{4-}$), or hexafluorophosphate ($PF^{6-}$), or a combination thereof are additional examples of supporting electrolytes that can be imbibed in the membranes.

The concentration of the supporting electrolyte in the redox flow battery membrane is not particularly limited, and in general can be up to about 25 moles/liter (M), for instance from about 0.1 M to about 25 M, from about 0.5 M to about 10 M, or from about 1 M to about 5 M in some embodiments.

The membrane/film can be imbibed with the supporting electrolyte according to any suitable methodology. For example, a densified PBI membrane or densified and dried PBI film can be imbibed with the supporting electrolyte in one embodiment by soaking in a solution of the supporting electrolyte for a period of time from a few minutes up to hours or days, optionally in an environment of increased temperature.

A redox flow battery membrane can include one or more additives that can be incorporated in the membrane at the time of membrane formation or in conjunction with the supporting electrolyte. By way of example, an organic small molecule, such as small C1-C4 alcohols (e.g., glycerol), small organic acids, urea, etc. can be incorporated in the redox flow battery membrane in conjunction with the imbibing of the supporting electrolyte.

In one embodiment, a redox flow battery membrane can incorporate a particulate, e.g., a titanium dioxide or a PBI particulate, generally in an amount of about 2 wt. % or less, which can decrease the porosity of the membranes. For instance, nano-sized particulates of PBI can be incorporated into the polymeric matrix during solidification of the PBI gel membrane by addition of the particulate to the polymer solution during hydrolysis.

A densified membrane as described can be incorporated in a redox flow battery for any use and in conjunction with any suitable electrolyte solutions and redox pairs. For instance, redox flow battery membranes as described can be incorporated in batteries for use in the renewable energy sector and/or in current power grids for backup/reducing energy interruption during peak usage times.

Figure 2:
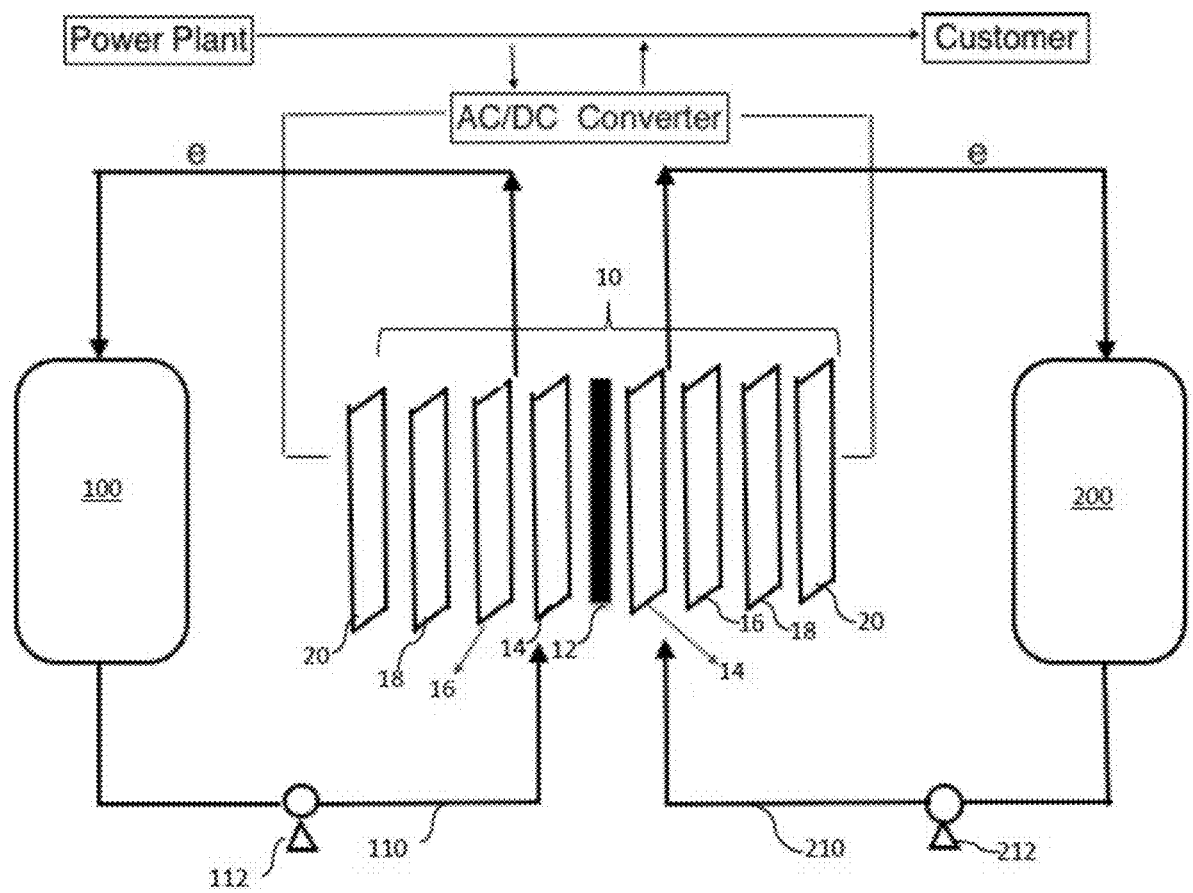
FIG. 2 schematically illustrates a redox flow battery as may incorporate a membrane as described herein.

On embodiment of a redox flow battery cell 10 is illustrated in FIG. 2. As shown, the cell can be in liquid communication with a first tank 100 that can retain a first electrolyte solution and a second tank 200 that can retain a second electrolyte solution. The tanks 100, 200 can be in liquid communication with either side of a redox flow battery membrane 12 of the cell 10 by use of conduits 110, 210, pumps 112, 212, valves, control systems, etc. The electrolyte solutions stored in the tanks 100, 200 can be circulated into either side of the cell 10 to contact either side of the membrane 12 by pumps 112 and 212, respectively, during charging and discharging.

The electrolyte solutions of a battery can each incorporate one member of a redox pair, as is known. In one particular embodiment, a redox flow battery membrane can be utilized in a VRB, as is known in the art. A VRB includes in a first electrolyte solution a vanadium-based compound in which the vanadium alternates between a +5-valent (pentavalent) and a +4-valent (tetravalent) vanadium such as, for example, $(VO_2)_2SO_4$, $VO(SO_4)$, or a combination thereof. The second electrolyte solution can include as active material vanadium-based compound in which the vanadium alternates between a +2-valent (divalent) to +3-valent (trivalent) vanadium, such as, for example, $VSO_4$, $V_2(SO_4)_3$, or a combination thereof.

The charge/discharge chemical reactions a VRB can be represented in one embodiment as:

Positive Electrode:

 (charge)

 (discharge)

$E^0 = +1.00$ V vs. standard hydrogen electrode (SHE)

Negative Electrode

 (charge)

 (discharge)

$E^0 = -0.26$ V vs. SHE

Overall Chemical Reaction:

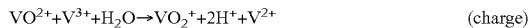 (charge)

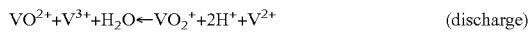 (discharge)

$E^0_{cell} = 1.26$ V vs. SHE

Of course, the redox flow batteries described herein are not limited to VRB, and other batteries including other redox pairs are encompassed herein. Exemplary redox pairs can include, without limitation, $Zn/Br_2$; Zn/Fe; Fe/Cr; polysulfide/$Br_2$; polysulfide/$I_2$; 9,10-anthraquinone-2,7-disulphonic acid (AQDS)/$Br_2$; Poly(methyl viologen) (poly(MV))/poly (2,2,6,6-tetramethylpiperidinyloxy-4-yl methacrylate) (poly(TEMPO)); bis-(trimethylammonio)propyl viologen tetrachloride (BTMAP-Vi)/BTMAP-ferrocene dichloride (BTMAP-Fc); 2,6-dihydroxyanthraquinone (2,6-DHAQ)/ferrocyanide; and alloxazine7/8-carboxylic acid (ACA)/ferrocyanide.

By way of example, in one embodiment, a battery can include an electrolyte system that includes as an active anolyte material a ferrocyanide such as $[Fe(CN)_6]_3$/$[Fe(CN)_6]_4$ and as an active catholyte material $Fe^{2+}$ and $Fe^{3+}$. The catholyte in such a system can include an iron/ligand complex, examples of which can include, without limitation, triethanolamine, diethanolamine, ethanolamine, N, N-bis-(2-hydroxyethyl)-(iminotris)-(hydroxymethyl)-methane and mixtures thereof in which the catholyte may have a ligand-to-iron ratio of from about 3:1 to about 10:1.

The electrolyte solutions can generally include the active material (e.g., vanadium ion, iron ion, etc.) in a concentration of from about 0.5 M to about 10 M. For instance, an electrolyte solution can include an active material in a concentration of at about 0.5M or more, about 0.6M or more, or about 0.7M or more, for instance from about 1M to about 3 M.

In one embodiment, the electrolyte solutions can include the respective active material at a concentration of the active material in a range from 1M to 10M. In one embodiment, when the active material has a concentration within this range, it can encourage the high-energy density and high-power density under which the redox flow battery membranes are capable of operating. In one embodiment, when the active material has a concentration of less than 1M, the active material included in the liquid can be too little of an amount per unit volume, thereby decreasing energy density. In one embodiment, when the active material has a concentration of more than 10M, the electrolyte solution can have a sharply increased viscosity and thus, a remarkably decreased oxidation/reduction reaction speed, thereby decreasing power density. The paired electrolyte solutions of a redox flow battery can include their respective redox pair active materials in the same concentration as one another or in different concentrations, with the preferred concentrations generally depending upon the particular redox pair to be utilized, the application of the battery, and the presence of any additional additives in the electrolyte solutions.

The electrolyte solutions of a battery can include additives, such as one or more redox flow battery supporting electrolytes as discussed previously. In one embodiment, the electrolyte solutions of a battery can include the supporting electrolyte that has been imbibed in the redox flow battery membrane.

An electrolyte solution can include a sulfuric acid supporting electrolyte in one embodiment. For instance, an electrolyte solution can include a mixture of sulfuric acid and water, that is, a sulfuric acid aqueous solution, in conjunction with the active material of the solution, for instance as a solvent. In one embodiment, a mixture of a supporting electrolyte and water, e.g., a sulfuric acid aqueous solution, can include a supporting electrolyte in a concentration of from about 1M to about 5M. The concentration of the supporting electrolyte can be selected in one embodiment so as to provide suitable solubility for the active material of the electrolyte solution. As such, the solution can exhibit desirable ion conductivity and viscosity and can avoid creating an overvoltage issue in the battery.

As indicated in FIG. 2, each side of a cell 10 can include additional components adjacent the membrane 12 as are known in the art including a conductive separator 14, e.g., a porous carbon paper, carbon cloth, carbon felt, or metal cloth (a porous film made of fiber-type metal or a metal film formed on the surface of a polymer fiber cloth), among others. The cell can also include electrodes 16, as are known, which may be the same or different from one another and may be made of a conductive substrate appropriate for the respective electrolyte solution of the cell (e.g., graphite). Current collectors 18 (e.g., gold-plated copper) can be in electrical communication with the electrodes 16, and a cell can include end plates 20 (e.g., stainless steel end plates), one on either side of the ½ cell, and facing oppositely away from a separator. The current collectors 18 provide electrical communication between the cell 10 and an exterior circuit, as shown.

Figure 3:
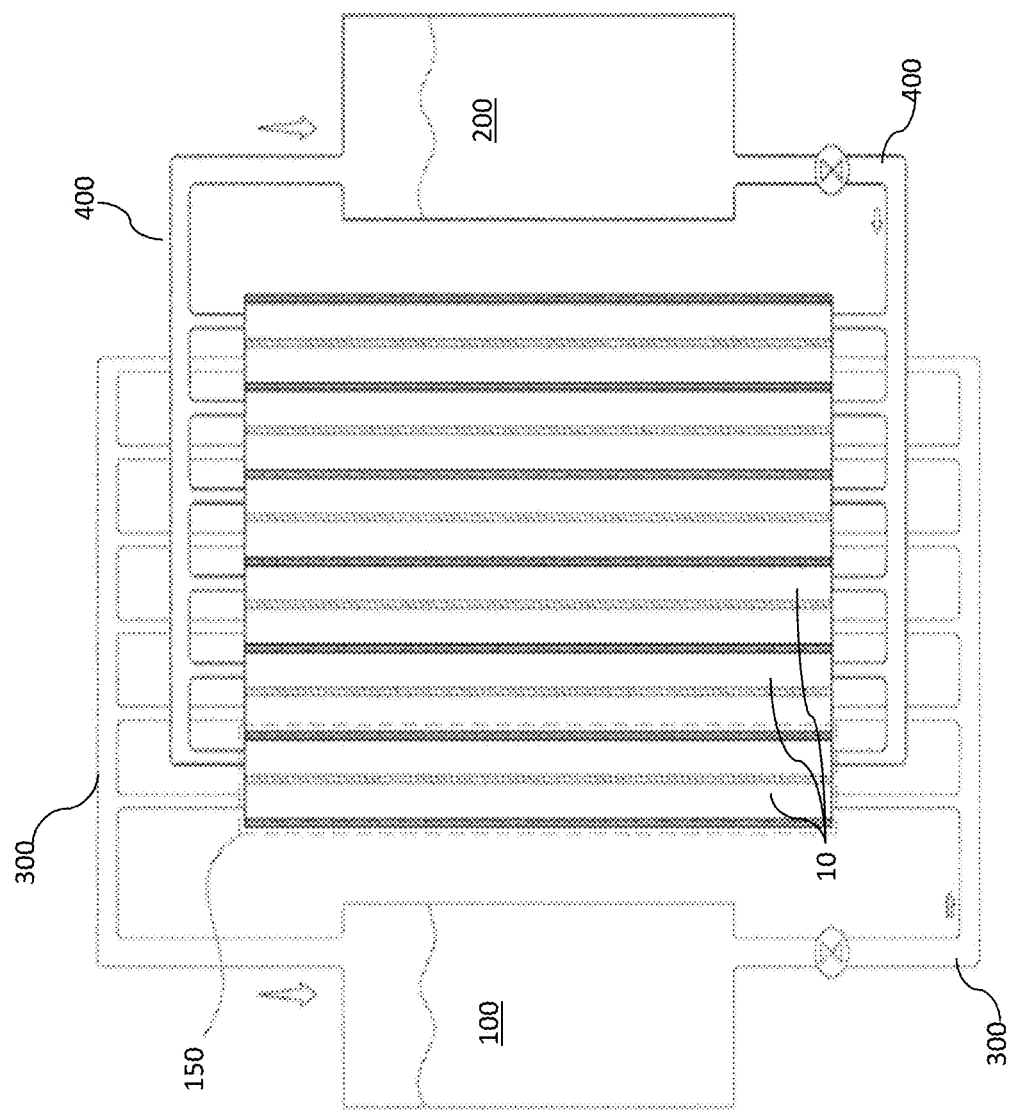
FIG. 3 schematically illustrates a multi-cell stack as may be included in a redox flow battery as described.

FIG. 3 illustrates a plurality of cells 10 arranged in a typical cell stack 150 of a redox flow battery. As shown, a first circulation path 300 can pass through one side of each of the cells 10 of the stack 150 such that the electrolyte solution of this portion of the battery flows through the path 300 and returns to the first tank 100. A second circulation path 400 passes through the other side of each of the cells 10 of the stack 150 such that the electrolyte solution of this portion of the battery flows through the path 400 and returns to the second tank 200. As indicated in FIG. 2, a redox flow battery can further include respective charging/discharging circuits, as well as converters, controllers, etc. as are known in the art to collect and supply power by use of the battery.

Redox flow battery membranes as described herein can allow for higher performing flow batteries operating under high current loads. Such improved operating conditions can mitigate the need for large electrochemical stacks, and thereby can reduce the overall cost of commercial flow battery devices. Further, the membranes of the present invention exhibit superior performance due to its high ionic conductivity. This, in-turn, can reduce the cost of the overall build by reducing the necessary stack size.

The present disclosure may be better understood with reference to the Examples set forth below.

Materials and Methods 3,3',4,4'-tetraaminobiphenyl (TAB, polymer grade, ~97.5%) was donated by BASF Fuel Cell, Inc. and used as received. Additional monomers were purchased and used as received. PPA (115%) was supplied from FMC Corporation and used as received. α,α'-Dichloro-p-xylene (>98.0% purity) was purchased from TCI and used as received.

Polymer Synthesis and Membrane Fabrication

A typical polymerization consisted of combination of the monomers with the TAB in a reaction kettle, mixing with an overhead stirrer and purging with dry nitrogen. The contents were heated in a high temperature silicone oil bath, and the temperature was controlled by a programmable temperature controller with ramp and soak features. Once the reaction was completed, determined by visual inspection of viscosity, the polymer solution was cast onto clear glass plates using a doctor blade with a controlled gate thickness of 15 mils. The cast solution was hydrolyzed into membranes in a humidity chamber regulated to 55% R.H. at 25° C.

Rinsing

As cast membranes were placed in DI water baths, and the pH of the water was monitored using pH strips. Water baths were replaced every 8 hours until a pH of 7 recorded.

Densification

Two-step densification included a first step in which a membrane was cut to dimensions of 10 cm×12 cm and then folded twice to provide a four-layer membrane. The four-layer membrane was then stretched using an Instron® 5843 tensile tester. During a second step, the stretched membrane was placed between two porous glass plates and clamped down around the perimeter to maintain the x-y dimensions of the membrane and allowed to dry overnight.

One step densification included placing the rinsed membrane between two porous polyethylene sheets and clamping along the perimeter to maintain the x-y dimensions. The sandwiched membrane was left upright at room temperature to dry for 24 hours.

Imbibing

Densified membranes were placed into a 2.6 M sulfuric acid bath for 24 hours to ensure equilibrium of acid doping Characterization The composition of sulfuric acid-doped PBI membranes was determined by measuring the relative amounts of polymer solids, water, and acid in the membranes. The sulfuric acid (SA) content of a membrane was determined by titrating a membrane sample with standardized sodium hydroxide solution (0.10 M) using a Metrohm 888 DMS Titrando autotitrator. Once titrated, the sample was thoroughly washed with DI water and dried at reduced pressures at 120° C. overnight. The dried sample was then weighed to determine the polymer solids content of the membrane.

Using equations 1 and 2, the polymer weight percentage and sulfuric acid weight percentage were determined, respectively;

$$\text{Polymer } w/w \% = \frac{W_{dry}}{W_{sample}} \cdot 100 \quad (1)$$

$$\text{Acid } w/w \% = \frac{M_{acid} \cdot V_{NaOH} \cdot c_{NaOH}}{2 \cdot W_{sample}} \quad (2)$$

where $W_{sample}$ is the weight of the sample before titration, $W_{dry}$ is the weight of final dried sample after titration, $M_{acid}$ is the molecular weight of sulfuric acid, and $V_{NaOH}$ and $c_{NaOH}$ are the volume and concentration of the sodium hydroxide solution required to neutralize the sulfuric acid to the first equivalence point. It is important to note that even though the second proton of sulfuric acid is much less acidic than the first, it is still a strong enough acid to cause both protons to be titrated simultaneously, $pK_{a1}=-3$ and $pK_{a2}=2$.

The number of moles of sulfuric acid per mole of PBI repeat unit (or the SA doping levels, X) were calculated from the equation:

$$X = \frac{V_{NaOH} \cdot c_{NaOH}}{2 \cdot W_{dry}/M_{polymer}} \quad (3)$$

where $V_{NaOH}$ and $c_{NaOH}$ are the volume and concentration of the sodium hydroxide solution required to neutralize the sulfuric acid to the first equivalence point, $W_{dry}$ is the final weight of the dried sample after titration, and $M_{polymer}$ is the molecular weight of the polymer repeat unit.

Conductivity

In-plane conductivity of the membrane was measured by a four-probe electrochemical impedance spectroscopy (EIS) method using a FuelCon (TrueData EIS PCM) electrochemical workstation over the frequency range from 1 Hz to 50 kHz. A membrane sample with a typical geometry of 1.0 cm×4.0 cm was fixed into the measuring 4-electrode head of the measurement. The conductivity of the membrane was calculated using the following equation:

$$\sigma = \frac{d}{l \cdot w \cdot R_m} \quad (4)$$

where d is the distance between the two inner probes, l is the thickness of the membrane, w is the width of the membrane, and $R_m$ is the ohmic resistance determined by the model fitting. Conductivities were conducted at room temperature, to replicate normal operating conditions of VRBs.

Vanadium Permeability

The crossover of vanadium(IV) ($VOSO_4$) was measured utilizing a PermeGear "side-by-side" direct permeation cell. The cell has two chambers with a 45 mL volume separated by the membrane under test. The temperature of the chambers was regulated at 25° C. with a recirculating water bath. A typical test experiment contained 1.5 M $VOSO_4$ in 2.6 M sulfuric acid in the donor chamber and 1.5 M $MgSO_4$ in 2.6 M sulfuric acid in the receptor chamber. Vanadium(IV) has a strong absorption characteristic at 248 nm; utilizing this property, the concentration of the receptor chamber was measured with a Shimadzu UV-2450 UV/Vis spectrometer at various time intervals. The $VO^{2+}$ permeability can be calculated using Fick's diffusion law, equation 5, $$P_s t = \ln\left[1 - 2\frac{c_r(t)}{c_r(0)}\right]\left[-\frac{Vd}{A}\right] \quad (5)$$

where: $c_r(t)$ is the receptor $VOSO_4$ concentration at time t, $c_r(0)$ is the donor initial $VOSO_4$ concentration, V is the donor and receptor solution volume, d is the membrane thickness, A is the active area of the membrane, and $P_s$ is the salt permeability.

Vanadium Test Cell

A VRB test cell was assembled with an active area of 24 cm² and utilized interdigitated flow fields for liquid electrolyte solutions machined into carbon plates. During use, a membrane was sandwiched between identical commercial carbon paper electrodes that had been previously heat treated to 400° C. for 30 hours in air, and gasketed with polytetrafluoroethylene (PTFE) films. The cell was equipped with two reservoirs of 100 mL electrolyte solution per side consisting of 1.60 M vanadium species having 3.55 average oxidation state and 4.2 M total sulfur content. The electrolytes were circulated though the cell at a constant flow rate of 120 mL/min by two acid-resistant diaphragm pumps. The charge/discharge cycling performance was measured at constant current densities ranging from 72 mA/cm² to 484 mA/cm² using a multi-channel potentiostat (Model BT2000, Arbin Instruments Inc., College Station, Tex.).

Example 1

A para-PBI gel membrane formed as described above using equimolar amounts of terephthalic acid, 3,3',4,4'-tetraminobiphenyl at 2.25 wt % monomer concentration, polymerized at 220° C. for 24 hours, was rinsed in a series of deionized water baths to remove phosphoric acid. pH indication paper was used to ensure all the acid had been removed before proceeding. The membrane was densified according to a two-step procedure during which the membrane was stretched to 1.7 times its original length during the first densification step. Following densification, the dried, dense PBI film was removed and placed in a solution of 2.6 M sulfuric acid for 24 hours before characterization.

Figure 4:
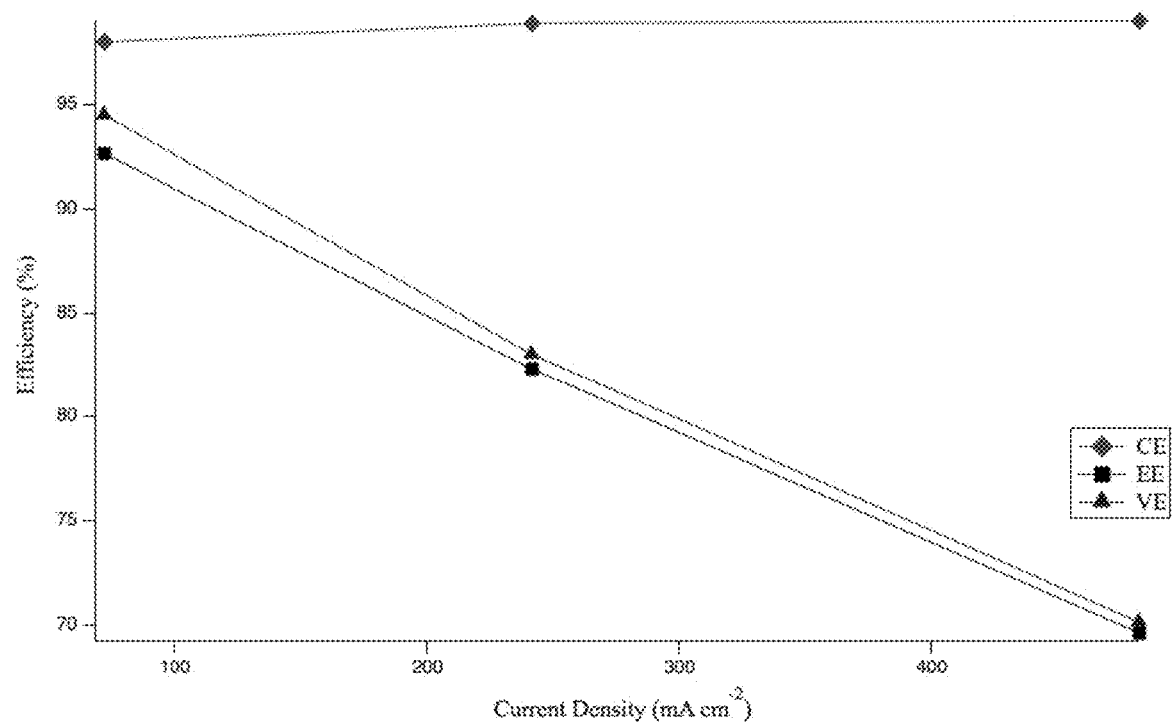
FIG. 4 presents the voltage efficiency (VE), the coulombic efficiency (CE) and the energy efficiency (EE) of a VRB incorporating a membrane as described herein.

In-plane ionic conductivity was measured at room temperature to be 175 mS/cm and the $VOSO_4$ permeability was determined to be $1.93 \times 10^{-8}$ cm²/s. The membrane was characterized by use of the VRB test cell as described. The VE, CE, and EE were measured. Results are shown in FIG. 4 and Table 1, below.

TABLE 1

| Current Density (mA/cm²) | C.E. (%) | E.E. (%) | V.E. (%) |
|---|---|---|---|
| 72 | 98.3 | 93.2 | 94.8 |
| 242 | 99.5 | 83.3 | 83.6 |
| 483 | 99.8 | 70.5 | 70.5 |

Example 2

A para-PBI membrane formed as described in Example 1 was rinsed in a series of deionized water baths to remove phosphoric acid. pH indication paper was used to ensure all the acid had been removed before proceeding. The membrane was densified according to a two-step procedure during which the membrane was stretched to 1.5 times its original length during the first densification step. Following densification, the dried, dense PBI film was removed and placed in a solution of 2.6 M sulfuric acid for 24 hours before characterization.

Figure 5:
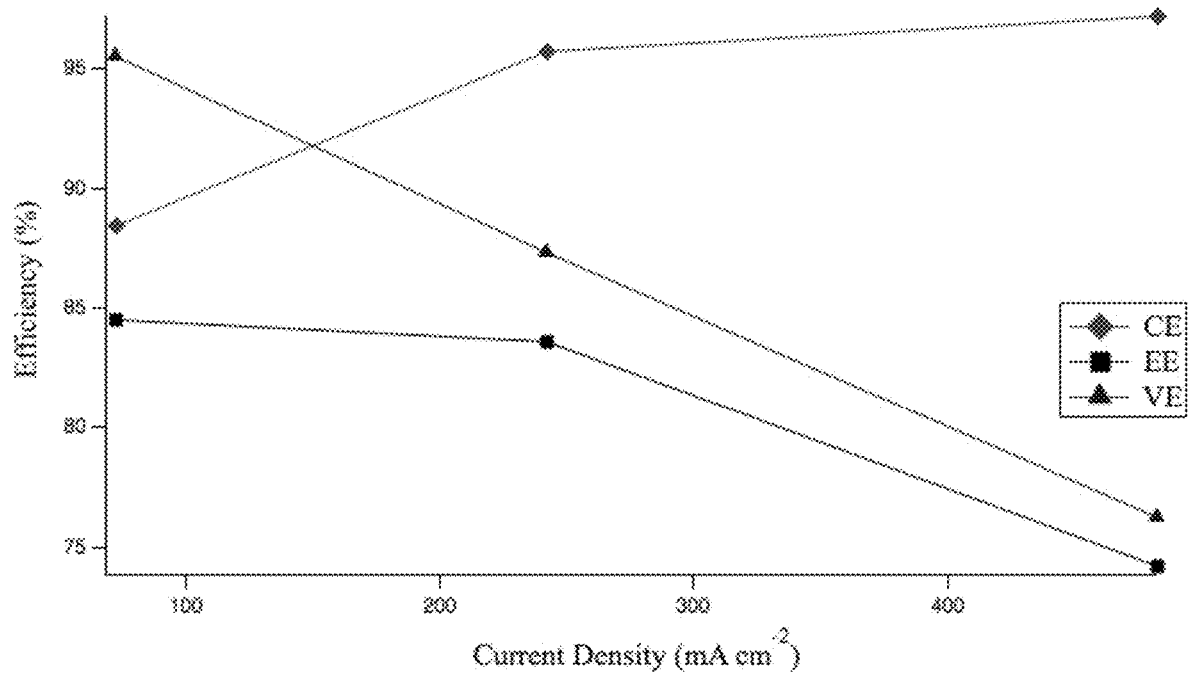
FIG. 5 presents the VE, CC, and EE of a VRB incorporating a membrane as described herein.

In-plane ionic conductivity was measured at room temperature to be 207.6 mS/cm. $VOSO_4$ permeability was determined to be $4.55 \times 10^{-8}$ cm²/s. The membrane was characterized by use of the VRB test cell. The VE, CE, and EE were measured. Results are shown in FIG. 5 and Table 2, below.

TABLE 2

| Current Density (mA/cm²) | C.E. (%) | E.E. (%) | V.E. (%) |
|---|---|---|---|
| 72 | 88.4 | 84.5 | 95.5 |
| 242 | 95.7 | 83.6 | 87.3 |
| 483 | 97.2 | 74.2 | 76.2 |

Example 3

A para-PBI membrane formed as described in Example 1 was rinsed in a series of deionized water baths to remove phosphoric acid. pH indication paper was used to ensure all the acid had been removed before proceeding. The wet thickness was measured to be 356.67±5.8 um, and membrane dimensions were cut to 45.72 cm×30.48 cm. The wet membrane was densified according to a one-step densification process. The dried film had a uniform thickness of 30 um.

Figure 6:
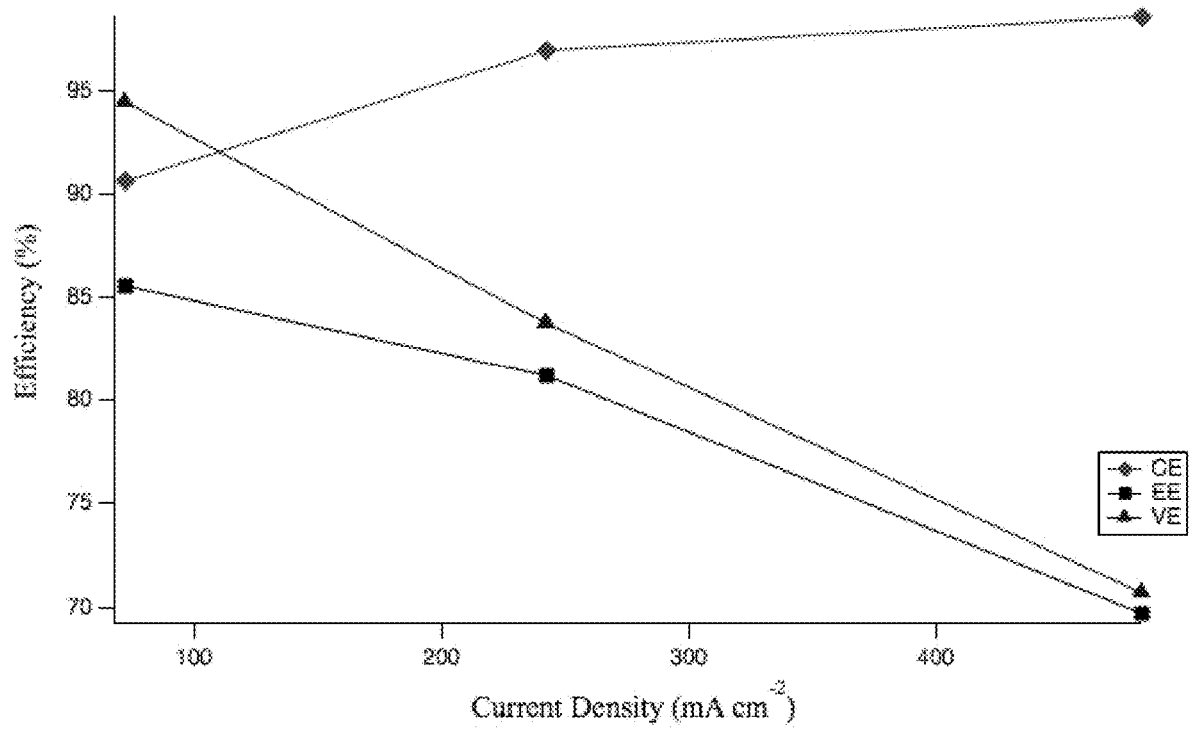
FIG. 6 presents the VE, CC, and EE of a VRB incorporating a membrane as described herein.

A first sample of the dry, dense film was placed in 2.6 M sulfuric acid for 24 hours before characterization. In-plane ionic conductivity was measured at room temperature to be 95.17 mS/cm. $VOSO_4$ permeability was measured to be $2.65 \times 10^{-8}$ cm²/s. The membrane was characterized by use of the VRB test cell. The VE, CE, and EE were measured. Results are shown in FIG. 6 and Table 3.

TABLE 3

| Current Density (mA/cm²) | C.E. (%) | E.E. (%) | V.E. (%) |
|---|---|---|---|
| 72 | 90.63 | 85.58 | 94.42 |
| 242 | 96.96 | 81.17 | 83.71 |
| 483 | 98.59 | 69.69 | 70.69 |

A second sample of the dry, dense film was placed in 85 wt. % phosphoric acid for 24 hours before characterization. Through-plane ionic conductivity was measured by a four-probe AC impedance spectroscopy method using a Zahner IM6e spectrometer over a frequency range of 1 Hz to 100 kHz with an amplitude of 5 mV. A two-component model with an ohmic resistance in parallel with a capacitor was employed to fit the experimental data. The conductivities of the membrane at different temperatures were calculated from the membrane resistance obtained from the model simulation, using the equation previously described. The membrane sample was subjected to two heating ramps to 180° C. The conductivity measured at 180° C. on the second heat ramp was 215.68 mS/cm.

Example 4

11.0824 g TAB (51.72 mmol), 13.9034 g of 2-sulfoterephthalic acid monosodium salt (2STPA, 51.85 mmol) and 600 g of PPA were added to the 1000 mL reaction kettle (4 wt % monomer charge). The polymerization was conducted for 48 hours in a nitrogen atmosphere at 220° C. The solution was applied to a glass substrate by means of a doctor blade with a 20-mil gate thickness and subsequently hydrolyzed for 24 hours. The s-PBI membrane imbibed in phosphoric acid was rinsed as described and densified according to the two-step densification process during which the membrane was stretched to 1.5 times its original length. The dried, dense PBI film was placed in a solution of 2.6 M sulfuric acid for 24 hours before characterization.

Figure 7:
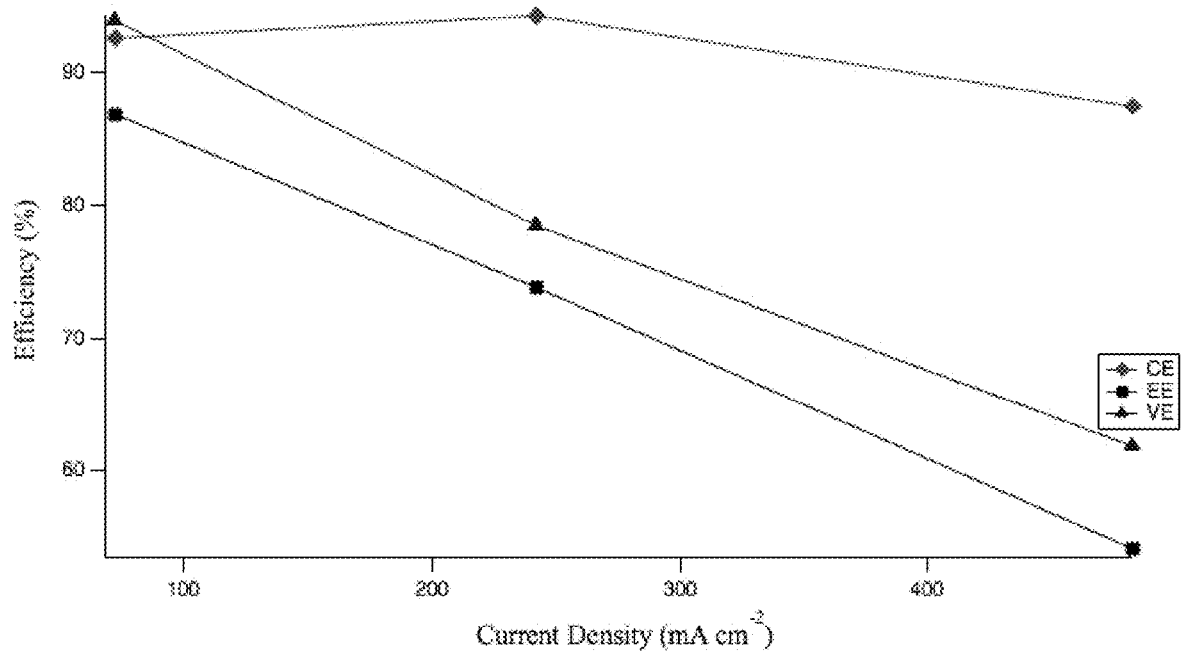
FIG. 7 presents the VE, CC, and EE of a VRB incorporating a membrane as described herein.

In-plane ionic conductivity was measured at room temperature to be 179.7 mS/cm. $VOSO_4$ permeability was tested as described and measured to be $2.60 \times 10^{-9}$ $cm^2/s$. The membrane was characterized by use of the VRB test cell. The VE, CE, and EE were measured. Results are shown in FIG. 7 and Table 4, below.

TABLE 4

| Current Density (mA/cm$^2$) | C.E. (%) | E.E. (%) | V.E. (%) |
|---|---|---|---|
| 72 | 92.48 | 86.75 | 93.78 |
| 242 | 94.18 | 73.78 | 78.34 |
| 483 | 87.37 | 54.16 | 61.90 |

Example 5

11.0824 g TAB (51.72 mmol), 13.9034 g 2STPA (51.85 mmol) and 600 g PPA were added to the reaction kettle (4 wt % monomer charge). The polymerization was conducted for 48 hours in a nitrogen atmosphere at 220° C. The solution was applied to a glass substrate by means of a doctor blade with a 20-mil gate thickness and subsequently hydrolyzed for 24 hours. The s-PBI membrane was rinsed and the wet thickness was measured to be 251.8±34 um. The wet membrane was densified according to the one-step densification process. The dried densified film had a uniform thickness of 37.7 um. The dry film was placed in 2.6 M sulfuric acid for 24 hours before characterization.

Figure 8:
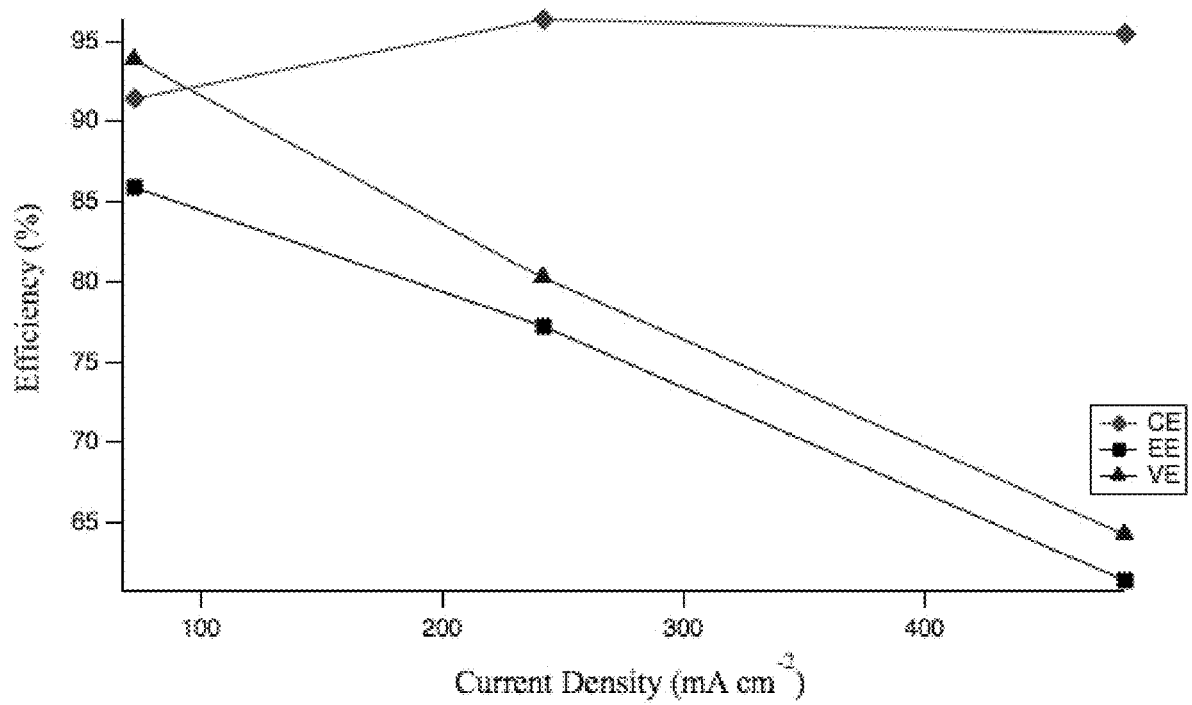
FIG. 8 presents the VE, CC, and EE of a VRB incorporating a membrane as described herein.

In-plane ionic conductivity was measured at room temperature to be 65.71 mS/cm. $VOSO_4$ permeability was measured to be $7.76 \times 10^{-9}$ $cm^2/s$. The membrane was characterized by use of the VRB test cell. The VE, CE, and EE were measured. Results are shown in FIG. 8 and Table 5, below.

TABLE 5

| Current Density (mA/cm$^2$) | C.E. (%) | E.E. (%) | V.E. (%) |
|---|---|---|---|
| 72 | 91.47 | 85.88 | 93.88 |
| 242 | 96.35 | 77.27 | 80.20 |
| 483 | 95.43 | 61.34 | 64.28 |

Example 6

6.615 g TAB (30.87 mmol), 6.119 g of 2,5-dihydroxyterephthalic acid (diOH-TPA, 30.88 mmol), and 401.29 g PPA were added to the reaction kettle and polymerized as described. The polymerization was conducted for 24 hours in a nitrogen atmosphere at 220° C. The solution was applied to a glass substrate by means of a doctor blade with a 20-mil gate thickness and subsequently hydrolyzed for 24 hours. The membrane was rinsed and densified according to the one-step densification process. The wet thickness was measured to be 404.44±10 um prior to densification. The dried, densified film had a uniform thickness of 31.1 um. The dry film was placed in 2.6 M sulfuric acid for 24 hours before characterization.

In-plane ionic conductivity was measured at room temperature to be 218.48 mS/cm. $VOSO_4$ permeability was measured to be $3.92 \times 10^{-8}$ $cm^2/s$.

Comparative Example 1 para-PBI membrane made by the PPA process was first rinsed several times in deionized water baths to remove phosphoric acid. pH indication paper was used to ensure all the acid had been removed before proceeding. The neutralized membrane was then placed in a solution of 2.6 M sulfuric acid for at least 24 hours before characterization. $VOSO_4$ permeability was determined to be $5.73 \times 10^{-7}$ $cm^2/s$.

Comparative Example 2

11.0824 g TAB (51.72 mmol), 13.9034 g 2STPA (51.85 mmol) and 600 g PPA were added to 1000 mL reaction kettle (4 wt. % monomer charge) equipped with an overhead mechanical stirrer. The polymerization was conducted for 48 hours in a nitrogen atmosphere at 220° C. The solution was applied to a glass substrate by means of a doctor blade with a 20-mil gate thickness and subsequently hydrolyzed for 24 hours. The sPBI membrane imbibed in phosphoric acid was rinsed in a series of deionized water baths to remove phosphoric acid. pH indication paper was used to ensure all the acid had been removed. The sPBI membrane was placed in 2.6 M sulfuric acid for 24 hours before characterization. $VOSO_4$ permeability was measured to be $4.89 \times 10^{-7}$ $cm^2/s$.

Comparative Example 3

6.615 g TAB (30.87 mmol), 6.119 g diOH-TPA (30.88 mmol), and 401.29 g PPA were added to a reaction kettle and stirred under a nitrogen atmosphere with an overhead mechanical stirrer. The polymerization was conducted for 24 hours in a nitrogen atmosphere at 220° C. The solution was applied to a glass substrate by means of a doctor blade with a 20-mil gate thickness and subsequently hydrolyzed for 24 hours. The membrane imbibed in phosphoric acid was rinsed in a series of deionized water baths to remove phosphoric acid. pH indication paper was used to ensure all the acid had been removed. The membrane was placed in 2.6 M sulfuric acid for 24 hours before characterization. $VOSO_4$ permeability was measured to be $7.23 \times 10^{-7}$ $cm^2/s$.

Comparative Example 4

Commercially available meta-PBI film, prepared from casting and drying N,N-dimethylacetamide solutions, was used as received. The film was placed in a solution of 2.6 M sulfuric acid for 24 hours before characterization. In-plane ionic conductivity in sulfuric acid was measured at room temperature to be 13.1 mS/cm. The $VO^{2+}$ permeability was determined to be $2.53 \times 10^{-11}$ $cm^2/s$.

Figure 9:
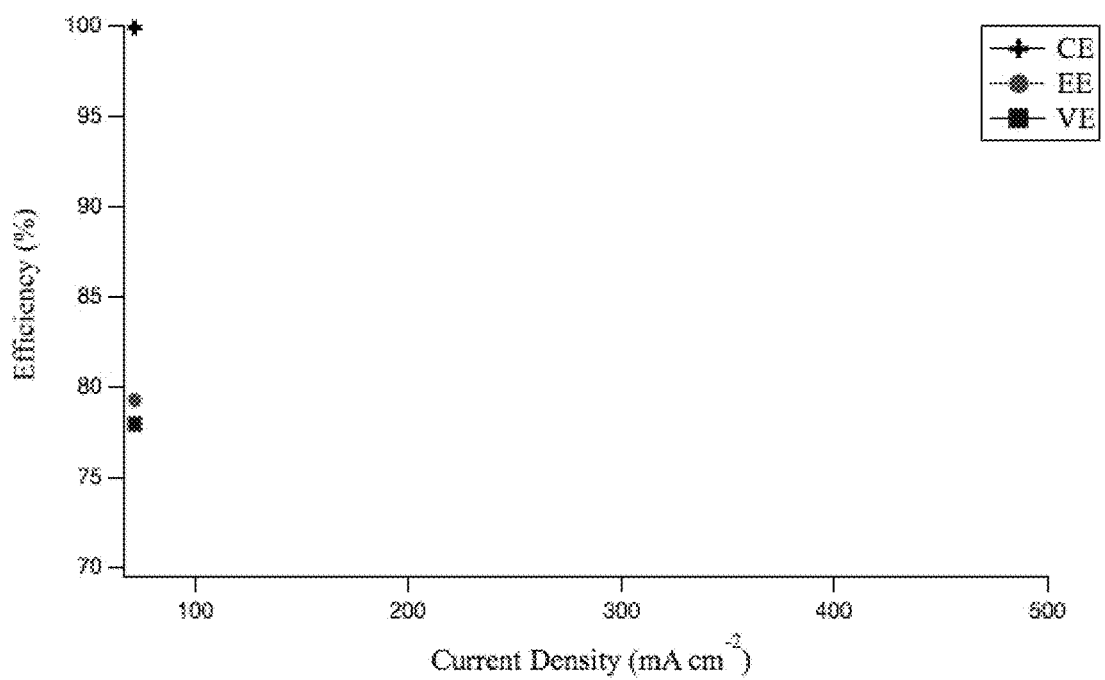
FIG. 9 presents the VE, CC, and EE of a VRB incorporating a comparison membrane.

The membrane was characterized by use of the VRB test cell. The VE, CE, and EE were measured at 72 mA/cm$^2$. Results are shown in FIG. 9 and Table 6, below.

TABLE 6

| Current Density (mA/cm$^2$) | C.E. (%) | E.E. (%) | V.E. (%) |
|---|---|---|---|
| 72 | 99.9 | 79.28 | 77.96 |
| 242 | — | — | — |
| 483 | — | — | — |

As shown, at higher current densities, the cell had no performance and could not be operated at current densities above about 72 mA/cm$^2$. This is because voltage is related to the membrane conductivity, which is very low for this membrane.

While certain embodiments of the disclosed subject matter have been described using specific terms, such description is for illustrative purposes only, and it is to be understood that changes and variations may be made without departing from the spirit or scope of the subject matter.

What is claimed is:

1. A method for forming a redox flow battery membrane comprising:
   forming a polymerization composition, the polymerization composition comprising a polyphosphoric acid, an aromatic or heteroaromatic tetraamino compound and an aromatic or heteroaromatic carboxylic acid compound, wherein the aromatic or heteroaromatic carboxylic acid compound comprises an aromatic or heteroaromatic polycarboxylic acid or ester, anhydride, or acid chloride thereof and/or comprises an aromatic or heteroaromatic diaminocarboxylic acid;
   polymerizing the aromatic or heteroaromatic tetraamino compound with the aromatic or heteroaromatic carboxylic acid compound to form a polymer solution comprising a polybenzimidazole dissolved in the polyphosphoric acid;
   shaping the polymer solution to form a membrane precursor comprising the polymer solution;
   hydrolyzing at least a portion of the polyphosphoric acid of the membrane precursor to form phosphoric acid and water, upon which the membrane precursor forms a gel membrane comprising the polybenzimidazole, the gel membrane being a self-supporting membrane capable of incorporating a liquid content of about 60 wt. % or more without loss of structure;
   densifying the gel membrane;
   rinsing the gel membrane to remove the phosphoric acid and remaining polyphosphoric acid; and
   imbibing the densified and rinsed gel membrane with a redox flow battery supporting electrolyte.

2. The method of claim 1, wherein the step of densifying the gel membrane comprises decreasing a thickness of the gel membrane.

3. The method of claim 1, wherein the step of densifying the gel membrane comprises drying the gel membrane.

4. The method of claim 1, wherein the step of densifying the gel membrane comprises stretching the gel membrane in one or more directions of a membrane surface.

5. The method of claim 1, the aromatic or heteroaromatic tetraamino compound comprising 2,3,5,6-tetraminopyridine; 3,3',4,4'-tetraminodiphenylsulfone; 3,3',4,4'-tetraminodiphenyl ether; 3,3',4,4'-tetraminobiphenyl; 1,2,4,5-tetraminobenzene; 3,3',4,4'-tetraminobenzophenone; 3,3',4,4'-tetraminodiphenylmethane; and 3,3',4,4'-tetraminodiphenyldimethyl-methane or salts thereof, or any combination thereof.

6. The method of claim 1, the aromatic or heteroaromatic carboxylic acid compound comprising a dicarboxylic acid.

7. The method of any of claim 6, the dicarboxylic acid comprising terephthalic acid; isophthalic acid; 3-sulfophthalic acid; 5-sulfoisophthalic acid; 2-sulfoterephthalic acid; tetrasulfophthalic acid; tetrasulfoisophthalic acid; tetrasulfoterephthalic acid; 5-hydroxyisophthalic acid; 4-hydroxyisophthalic acid; 2-hydroxyterephthalic acid; 2,5-dihydroxyterephthalic acid; 2,6-dihydroxyisophthalic acid; 4,6-dihydroxyisophthalic acid; 2,3-dihydroxyphthalic acid; 2,4-dihydroxyphthalic acid; 3,4-dihydroxyphthalic acid; 1,8-dihydroxynaphthalene-3,6-dicarboxylic acid; diphenylsulfone-4,4'-dicarboxylic acid; or any combination thereof.

8. The method of claim 1, the hydrolysis being carried out at a temperature of from about 0° C. to about 150° C. and at a relative humidity of from about 20% to 100%.

9. The method of claim 1, wherein the supporting electrolyte comprises a mineral acid, an organic acid, or a combination of one or more mineral acids and/or one or more organic acid.

10. The method of claim 1, wherein the supporting electrolyte comprises hydrochloric acid, nitric acid, fluorosulfonic acid, sulfuric acid, acetic acid, formic acid, p-toluene sulfonic acid, trifluoromethane sulfonic acid, or any mixture thereof; or comprises sodium chloride, potassium chloride, sodium hydroxide, potassium hydroxide, sodium sulfide, potassium sulfide, or any combination thereof; or the supporting electrolyte comprising a tetraalkylammonium cation.

11. The method of claim 1,
   wherein
   the redox flow battery membrane exhibits an in-plane ionic conductivity in a 2.6 M sulfuric acid solution of about 50 mS/cm$^2$ or greater.

12. The method of claim 1, wherein the polybenzimidazole of the densified polybenzimidazole gel membrane comprises one or more of the following repeating units:

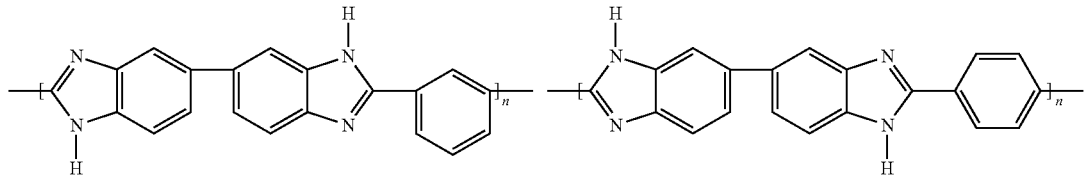

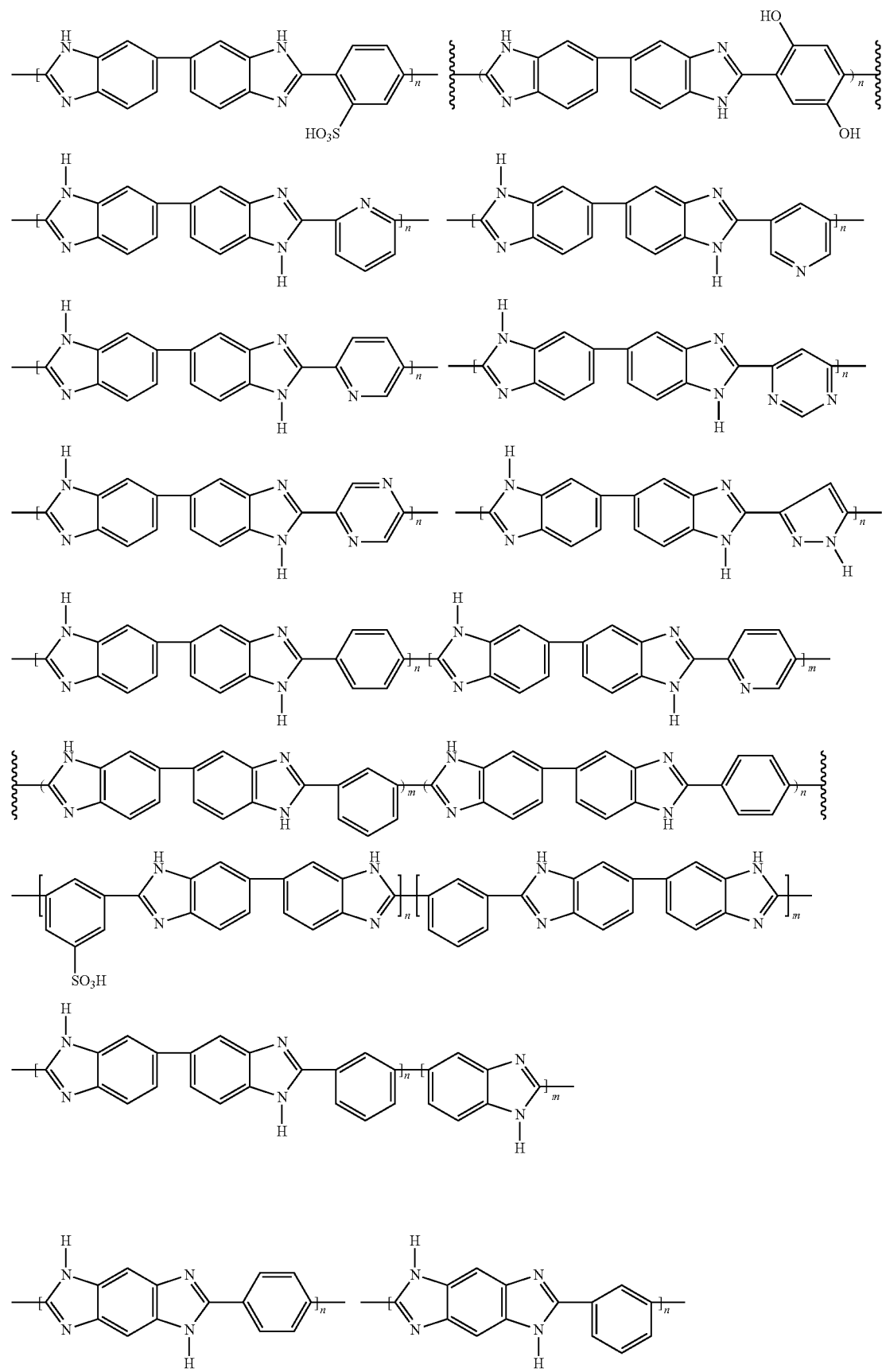

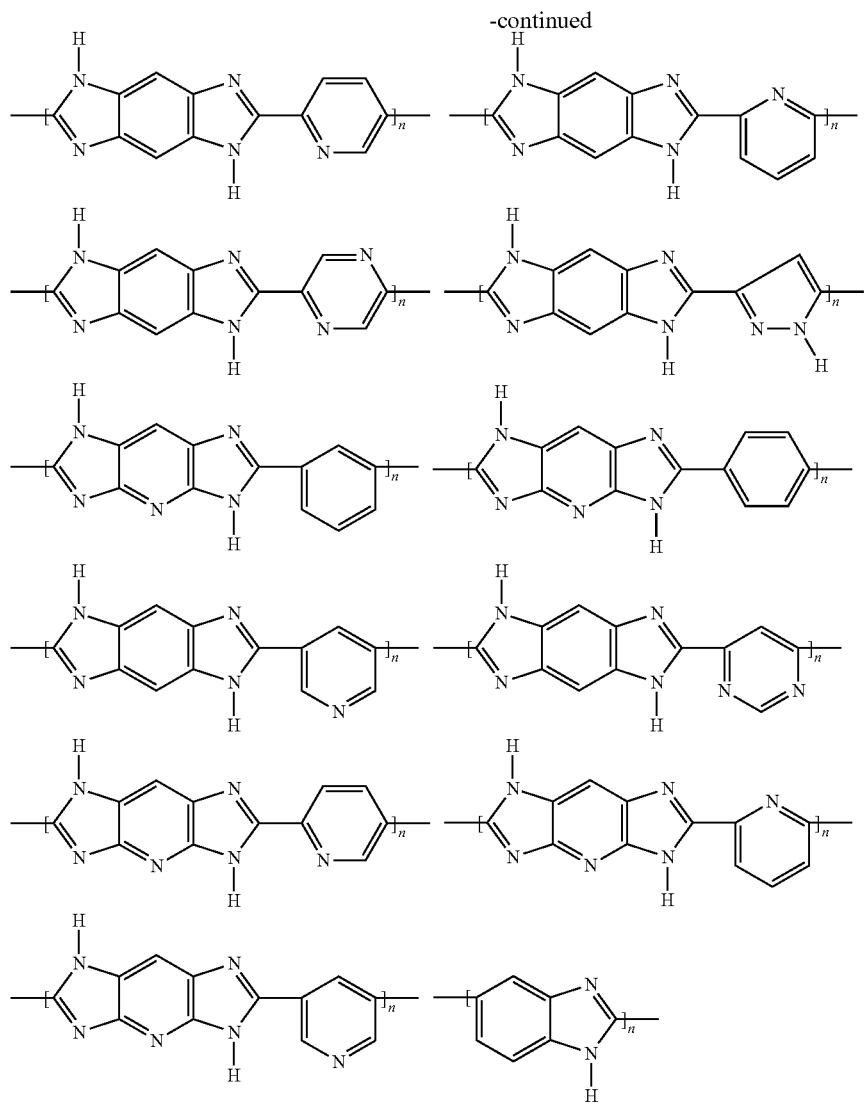

or any combination thereof, in which n and m are each independently 1 or greater.

13. The method of claim 1, further comprising crosslinking the polybenzimidazole gel membrane.

14. A method for forming a redox flow battery membrane comprising:
forming a polymerization composition, the polymerization composition comprising a polyphosphoric acid, an aromatic or heteroaromatic tetraamino compound and an aromatic or heteroaromatic carboxylic acid compound, wherein the aromatic or heteroaromatic carboxylic acid compound comprises an aromatic or heteroaromatic polycarboxylic acid or ester, anhydride, or acid chloride thereof and/or comprises an aromatic or heteroaromatic diaminocarboxylic acid;
polymerizing the aromatic or heteroaromatic tetraamino compound with the aromatic or heteroaromatic carboxylic acid compound to form a polymer solution comprising a polybenzimidazole dissolved in the polyphosphoric acid;
shaping the polymer solution to form a membrane precursor comprising the polymer solution;
hydrolyzing at least a portion of the polyphosphoric acid of the membrane precursor to form phosphoric acid and water, upon which the membrane precursor forms a gel membrane comprising the polybenzimidazole;
rinsing the gel membrane to remove the phosphoric acid and remaining polyphosphoric acid;
drying the gel membrane; and
imbibing the dried and rinsed gel membrane with a solution comprising sulfuric acid.

15. The method of claim 14, wherein the polymer solution is shaped according to a process comprising casting, spray coating, or knife coating.

16. The method of claim 14, wherein the gel membrane is rinsed multiple times.

17. The method of claim 14, wherein the gel membrane is rinsed according to a process that comprises soaking the gel membrane in a water bath.

18. The method of claim 17, wherein the water bath is heated.

19. The method of claim 14, wherein the rinsing is carried out at ambient temperature.

20. The method of claim 14, wherein the solution includes the sulfuric acid at a concentration of from about 1 M to about 25 M.

* * * * *